United States Patent
Newcomb

(10) Patent No.: US 12,016,478 B2
(45) Date of Patent: Jun. 25, 2024

(54) SECURE PACKAGE DELIVERY AND PICK-UP SYSTEM

(71) Applicant: Royce Newcomb, Fresno, CA (US)

(72) Inventor: Royce Newcomb, Fresno, CA (US)

(*) Notice: Subject to any disclaimer, the term of this patent is extended or adjusted under 35 U.S.C. 154(b) by 161 days.

(21) Appl. No.: 17/398,979

(22) Filed: Aug. 10, 2021

(65) Prior Publication Data

US 2022/0031105 A1 Feb. 3, 2022

Related U.S. Application Data

(63) Continuation-in-part of application No. 16/995,686, filed on Aug. 17, 2020, now Pat. No. 11,087,269,
(Continued)

(51) Int. Cl.
*A47G 29/14* (2006.01)
*B65G 1/137* (2006.01)
(Continued)

(52) U.S. Cl.
CPC ............ *A47G 29/141* (2013.01); *A47G 29/14* (2013.01); *B65G 1/1373* (2013.01);
(Continued)

(58) Field of Classification Search
CPC ................. A47G 29/141; A47G 29/14; A47G 2029/145; A47G 2029/147;
(Continued)

(56) References Cited

U.S. PATENT DOCUMENTS

| 476,139 A | 5/1892 | Faw |
| 1,579,520 A | 4/1926 | Fleming |

(Continued)

FOREIGN PATENT DOCUMENTS

| GB | 336850 A | 10/1930 |
| GB | 2366597 A | 3/2002 |

(Continued)

OTHER PUBLICATIONS

Japanese Office Action dated Oct. 5, 2021 for JP Patent Application No. 2019-529703 from Japanese Patent Office, pp. 1-18, Tokyo, Japan (English-language translation included on pp. 1-9).
(Continued)

*Primary Examiner* — William L Miller
(74) *Attorney, Agent, or Firm* — Barry Choobin; Patent 360

(57) ABSTRACT

A secure package delivery and pick-up system includes a security door having a frame, and one or more collapsible storage compartments affixed to the frame. The collapsible storage compartments are configured for accommodating packages. An electronic unit is mounted on the frame, and is configured for electronically controlling an operation for the collapsible storage compartments. A security device is connected to the security door and receives images of a physical object from a first camera, receives an indication from at least one security tether indicating movement of the at least one physical object, and provides an alert based on the indication of movement of the at least one physical object.

26 Claims, 18 Drawing Sheets

Related U.S. Application Data which is a continuation-in-part of application No. 15/670,018, filed on Aug. 7, 2017, now Pat. No. 10,743,693.

(60) Provisional application No. 62/371,976, filed on Aug. 8, 2016.

(51) Int. Cl.
| | |
|---|---|
| *E05B 47/00* | (2006.01) |
| *E05B 65/00* | (2006.01) |
| *E06B 7/32* | (2006.01) |
| *G05B 15/02* | (2006.01) |
| *G05B 19/4155* | (2006.01) |
| *G06K 7/10* | (2006.01) |
| *G06Q 10/0833* | (2023.01) |
| *G06Q 10/0836* | (2023.01) |
| *G07C 9/00* | (2020.01) |

(52) U.S. Cl.
CPC .......... *E05B 47/0001* (2013.01); *E05B 65/00* (2013.01); *E06B 7/32* (2013.01); *G05B 15/02* (2013.01); *G05B 19/4155* (2013.01); *G06K 7/10366* (2013.01); *G06Q 10/0833* (2013.01); *G06Q 10/0836* (2013.01); *G07C 9/00* (2013.01); *G07C 9/00309* (2013.01); *G07C 9/00817* (2013.01); *G07C 9/00896* (2013.01); *A47G 2029/145* (2013.01); *A47G 2029/147* (2013.01); *A47G 2029/149* (2013.01); *B65G 2201/0285* (2013.01); *B65G 2203/046* (2013.01); *E05B 2047/0088* (2013.01); *E05Y 2400/10* (2013.01); *E05Y 2400/85* (2013.01); *E05Y 2900/131* (2013.01); *G05B 2219/31043* (2013.01); *G06K 7/10297* (2013.01); *G07C 9/00571* (2013.01); *G07C 2009/00825* (2013.01); *G07C 9/00912* (2013.01); *G07C 2009/0092* (2013.01)

(58) Field of Classification Search
CPC .......... A47G 2029/149; B65G 1/1373; B65G 2201/0285; B65G 2203/046; E05B 47/0001; E05B 65/00; E05B 2047/0088; E06B 7/32; E06B 7/34; G05B 15/02; G05B 19/4155; G05B 2219/31043; G06K 7/103666; G06K 7/10297; G06Q 10/0823; G06Q 10/0836; G07C 9/00; G07C 9/00309; G07C 9/00817; G07C 9/00896; G07C 9/00912; G07C 9/00571; G07C 2009/00825; G07C 2009/0092; E05Y 2400/10; E05Y 2400/85; E05Y 2900/131

See application file for complete search history.

(56) References Cited

U.S. PATENT DOCUMENTS

| | | | |
|---|---|---|---|
| 1,626,157 A | 4/1927 | Rossman | |
| 1,992,640 A | 2/1935 | Steen | |
| 2,456,479 A | 12/1948 | Antil | |
| 2,669,385 A | 6/1954 | Curcio | |
| 2,781,964 A | 2/1957 | Ledgerwood | |
| 4,615,212 A | 10/1986 | Kugler et al. | |
| 6,426,699 B1 | 7/2002 | Porter | |
| 9,861,221 B2 | 1/2018 | Jiang | |
| 9,926,737 B2* | 3/2018 | Wanjohi | A47G 29/126 |
| 9,955,812 B2* | 5/2018 | Charbeneau | A47G 29/22 |
| 10,299,617 B1 | 5/2019 | Castellanos | |
| 10,321,780 B1 | 6/2019 | James | |
| 10,537,196 B1 | 1/2020 | Macpherson | |
| 10,588,439 B2* | 3/2020 | Charbeneau | A47G 29/22 |
| 10,772,451 B2* | 9/2020 | Vernal Silva | A47G 29/20 |
| 10,878,647 B2* | 12/2020 | Kane | G07C 9/00912 |
| 10,954,068 B2* | 3/2021 | Nevison | G05B 15/02 |
| 11,278,144 B2* | 3/2022 | Vernal Silva | A47G 29/141 |
| 11,328,545 B2* | 5/2022 | Kane | G07C 9/00896 |
| 11,346,150 B1* | 5/2022 | Johnston | E06B 7/32 |
| 11,369,223 B2* | 6/2022 | Plummer | A47G 29/141 |
| 11,495,068 B1* | 11/2022 | Valentine | G07C 9/00309 |
| 11,534,015 B2* | 12/2022 | Janas | A47G 29/141 |
| 11,536,079 B2* | 12/2022 | Schler | E05F 15/77 |
| 11,751,708 B2* | 9/2023 | Wu | A47G 29/141 232/19 |
| 11,839,319 B1* | 12/2023 | Parr | A47G 29/28 |
| 2002/0156645 A1 | 10/2002 | Hansen | |
| 2003/0006275 A1 | 1/2003 | Gray | |
| 2004/0083371 A1 | 4/2004 | Algazi et al. | |
| 2004/0254802 A1 | 12/2004 | Miller et al. | |
| 2008/0211170 A1 | 9/2008 | Motamed | |
| 2011/0057774 A1 | 3/2011 | Van Rysselberghe | |
| 2013/0098980 A1 | 4/2013 | Supulski et al. | |
| 2016/0247344 A1* | 8/2016 | Eichenblatt | G07C 9/00896 |
| 2016/0286998 A1 | 10/2016 | Lindbo | |
| 2016/0331171 A1 | 11/2016 | Jiang | |
| 2017/0286905 A1* | 10/2017 | Richardson | G06Q 10/0832 |
| 2018/0070753 A1* | 3/2018 | Eveloff | H04W 4/025 |
| 2018/0228310 A1 | 8/2018 | Enobakhare et al. | |
| 2019/0261802 A1 | 8/2019 | Vernal et al. | |
| 2019/0320836 A1 | 10/2019 | Guanch et al. | |
| 2019/0344930 A1 | 11/2019 | Jessie | |
| 2019/0362577 A1 | 11/2019 | Vigil | |
| 2020/0013008 A1* | 1/2020 | Newcomb | G05D 1/102 |
| 2020/0071991 A1 | 3/2020 | Patel | |
| 2021/0005033 A1* | 1/2021 | Roman | G06Q 10/0833 |

FOREIGN PATENT DOCUMENTS

| | | | |
|---|---|---|---|
| JP | S61-204536 U | | 12/1986 |
| JP | H03064577 U | | 6/1991 |
| JP | H08100580 A | | 4/1996 |
| JP | H09140550 A | * | 6/1997 |
| JP | 10-276893 A | | 10/1998 |
| JP | 11-247548 A | | 9/1999 |
| JP | 2005248542 A | | 9/2005 |
| JP | 2006043042 A | | 2/2006 |
| JP | 2006279506 A | | 10/2006 |
| JP | 3147896 U | | 1/2009 |
| JP | 2017052645 A | | 3/2017 |
| WO | 2004-040841 A1 | | 5/2004 |

OTHER PUBLICATIONS

International Search Report & Written Opinion dated Dec. 8, 2017 for International Application PCT/IB2017/054821 from Korean Intellectual Property Office, pp. 1-16, Republic of Korea.

International Preliminary Report on Patentability dated Feb. 12, 2019 for International Application PCT/IB2017/054821 from International Bureau of WIPO, pp. 1-14, Geneva, Switzerland.

U.S. Non-Final Office Action for U.S. Appl. No. 15/670,018 dated Apr. 29, 2020.

U.S. Notice of Allowance for U.S. Appl. No. 15/670,018 dated Jul. 9, 2020.

U.S. Non-Final Office Action for U.S. Appl. No. 16/995,686 dated Nov. 20, 2020.

U.S. Notice of Allowance for U.S. Appl. No. 16/995,686 dated Mar. 31, 2021.

* cited by examiner

SECURE PACKAGE DELIVERY AND PICK-UP SYSTEM

CROSS-REFERENCE TO RELATED APPLICATIONS

This application is a continuation-in-part to patent application of U.S. Ser. No. 16/995,686 filed on Aug. 17, 2020, now U.S. Pat. No. 11,087,269 issued on Aug. 10, 2021, which claims priority to U.S. Ser. No. 15/670,018 filed on Aug. 7, 2017, now U.S. Pat. No. 10,743,693 that claims priority to U.S. Provisional Patent No. 62/371,976 filed on Aug. 8, 2016, which are each incorporated herein by reference in their entirety.

FIELD

The embodiments herein are generally related to the field of package delivery systems. The embodiments herein are particularly related to systems for secure delivery of packages at unattended locations. The embodiments herein are more particularly related to an electronic box or secured automated receptacles fitted with electronic door for the receipt, storage and return pick-up of packages.

BACKGROUND

With the advent of electronic commerce in recent times, home delivery of products has become more and more popular. The delivery persons are assigned the job of delivering the packages to users. The service is completed, when the user accepts the delivery of the package. However, there are various circumstances that impact the ability of delivery firms in completing the delivery process, especially when an individual is not available to accept the package to be delivered. In some cases, the delivery firms are allowed to leave the package even though a user is not available to accept it. The packages are left unattended at the user's residential or business address. This always carries the risk of theft or damage of the package due to weather conditions.

Thus, the delivery persons are instructed for security reasons to delivery packages only when the user is available to receive the package. The delivery is confirmed by collecting a signature of the user to confirm an acceptance of the package. The delivery firms are instructed not to leave packages unless they are accepted by the users. The delivery firms need to make subsequent attempts to deliver the package when the user is not available to receive the packages. Even after several subsequent attempts, the deliveries are unsuccessful in some cases. This results in delayed delivery of the package or the package is returned to the sender/seller because of unsuccessful attempts at delivery. This causes inconvenience to the users and additional costs for the seller/delivery firms due to repeated failed delivery attempts and returned merchandise.

Furthermore, in some cases, the users are provided with an option of picking up the product at a specified outlet. But, such locations are not always nearby to the user location and hence involve additional costs. Thus, this option does not offer a convenient alternative to the user. Similarly, for returning the pick-up, the users need to courier the packages themselves to the seller or have to leave it outdoors at a specified time/day and to ensure the availability of the packages at the time of visit of the delivery person for return pick-up. Thus, the packages are always at a risk of theft or damage. Additionally, some products such as grocery, food items and medicines get spoiled when they are left unattended for longer durations as hot or cold storage of such products is needed immediately on delivery.

Hence, there is a need for providing a secure and convenient option for delivery and pick-up of packages at unattended locations. There is also a need for a modular system for delivery and pick-up of packages of varying size and weight. Further, there is a need for an automated receptacle with electronic door for the receipt, storage and pickup of a package.

The above mentioned shortcomings, disadvantages and problems are addressed herein, and which will be understood by reading and studying the following specification.

SUMMARY

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

One or more embodiments pertains to a secure package delivery and pick-up system that the system that includes a security door comprising a frame. One or more collapsible storage compartments are affixed to the frame. Each of the one or more collapsible storage compartments is configured for accommodating one or more packages. Open ends of the one or more collapsible storage compartments are secured using compartment doors. An electronic unit is mounted on the frame. The electronic unit is configured for electronically controlling an operation for the one or more collapsible storage compartments for secure delivery or return pick-up of the one or more packages. A security device is coupled to the security door. The security device includes a memory device having instructions, and at least one processor configured for executing the instructions to: receive images of at least one physical object from a first camera coupled to the at least one processor; receive an indication from at least one security tether indicating movement of the at least one physical object; and provide an alert based on the indication of movement of the at least one physical object.

Some embodiments pertain to a security device system that includes a security door comprising a frame, and one or more collapsible storage compartments affixed to the frame. Each of the one or more collapsible storage compartments is configured for accommodating one or more packages. The security door further includes an electronic unit mounted on the frame. The electronic unit is configured for electronically controlling an operation for the one or more collapsible storage compartments for secure delivery or return pick-up of the one or more packages. The system further includes a security device having first memory device including first instructions, and a first processor that is configured for executing the first instructions to: receive images of the at least one physical object from a first camera coupled to the first processor; receive an indication from at least one security tether indicating movement of the at least one physical object; and provide an alert based on the indication of movement of the at least one physical objects. The system additionally includes a customer interface that includes: a second memory device including second instructions; a second processor configured for executing the second instructions to: receive delivery details information; retrieve customer identification information; process the delivery details and customer identification information; and communicate the delivery details and the customer identification information through a first network to the security device and to a server.

The various embodiments herein provide a secure package delivery and pick-up system. The system comprises a security door comprising a frame. The frame is configured for attaching to any firm surface of a building. The security door is configured for providing access to the building after successful verification of the user. The security door comprises one or more collapsible compartments affixed to the frame. Each collapsible compartment is configured for accommodating one or more packages meant for delivery or return pick-up. Each compartment comprises a series of four sided metal or wooden boxes with open ends designed to slide into one another in a telescopic manner to accommodate one or more packages. Both open ends of the compartment are secured using compartment doors for delivery and reception of the one or more packages respectively. The series of four sided metal or wooden boxes are configured for extending in a perpendicular direction to the length of the frame to achieve maximum storage size of the compartment and for contracting within each other to achieve a minimum size of the compartment. Each collapsible compartment comprises an external flange on the exterior side of the compartment and an internal flange on the interior side of the compartment for providing strength and support to the compartment in extended and collapsed state. The security door further comprises an electronic unit mounted on the frame. The electronic unit is configured for electronically controlling the operation of the one or more compartments for secure delivery or return pick-up of the one or more packages at unmanned locations.

According to an embodiment herein, the system further comprises a cloud based server comprising a registration module configured for registering one or more users with the system for operating the security door and the one or more compartments provided in the security door. The one or more users are registered with the system by providing a plurality of user details and the details of the one or more smartphones associated with each user. The one or more user details comprise name, address, contact numbers and biometric data. The server also comprises a storage unit configured for storing the plurality of user details, the details of the one or more smartphones associated with each user registered with the system and the global positioning system (GPS) coordinates of the secured door. The server further comprises a tracking module configured for tracking the delivery and a pick-up activity of the one or more packages to an appropriate compartment. The server still further comprises an electronic key generation module configured for generating an electronic key for exchanging between the user and a delivery person for operating the compartment door. The server still further comprises a notification module configured for sending automatic notifications to the one or more users upon successful delivery or pick-up of the package.

According to an embodiment herein, the electronic unit comprises a control unit, a transceiver unit, a digital display, one or more cameras, a scanner unit, one or more sensors and a power unit.

According to an embodiment herein, the transceiver unit is configured for transmitting an electronic key entered by the user to verify with the server for operating the door or individual compartments. The transceiver unit is further configured for transmitting the information captured using one or more sensors.

According to an embodiment herein, the control unit is configured for controlling the opening and closing operations of appropriate compartment door on successful verification of secure electronic key.

According to an embodiment herein, the digital display is configured for displaying the video messages recorded by the user to the appropriate delivery person or vice-versa.

According to an embodiment herein, the one or more cameras are configured for recording activities in the vicinity of the security door on detecting any motion using motion sensors during any time of the day for security purpose.

According to an embodiment herein, the scanner unit is configured for scanning radio frequency identification (RFID) tags of the parcel and the biometric data of the one or more users registered with each door for security purpose.

According to an embodiment herein, the one or more sensors are configured for detecting a plurality of parameters surrounding the door, and wherein the plurality of parameters comprises a motion detection in the vicinity of the door, International Mobile Equipment Identity (IMEI) number of the smartphone present in close vicinity of the door, smoke and fire.

According to an embodiment herein, the power unit is configured for supplying sufficient power required for operation of the door using one or more rechargeable batteries.

According to an embodiment herein, the system offers keyless entry through the door upon successful verification of the electronic key.

According to an embodiment herein, the system further comprises one or more multi-stage actuators and support guides for expansion and contraction of the one or more compartments. A power source used for the expansion and contraction of each compartment is either manual or electric.

According to an embodiment herein, the one or more compartments provided in the security door are customizable in capacity for accommodating one or more packages of different sizes and weights.

According to an embodiment herein, the system comprises a portal or platform for connecting one or more external Internet of Things (IOT) devices with the system, and wherein the one or more external IOT devices comprises camera, one or more sensors, communication modules.

According to an embodiment herein, the one or more compartments optionally comprise hot and cold boxes for storing hot or refrigerated products respectively.

According to an embodiment herein, the system is further configured for providing a mobile application for installing on the smartphone of the user, and wherein the mobile application is configured for enabling the user to remotely track the package delivery or pick-up activity, for viewing captured information from one or more Internet of Things (IOT) devices, for administration activity like adding/removing user and for exchanging secured electronic keys with the control unit.

According to an embodiment herein, the system is further configured for enabling the user to share the secured electronic keys with other users for a predetermined duration for accessing the building through the security door and for usage of the one or more compartments.

According to an embodiment herein, the mobile application provided to the user is configured for allowing the user to lock or unlock the security door or the individual compartments wirelessly from a remote location.

According to an embodiment herein, the system is further configured for enabling the user to remotely upgrade the software of the control unit to provide additional features and enhance security options.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments.

BRIEF DESCRIPTION OF THE DRAWINGS

The other objects, features and advantages will occur to those skilled in the art from the following description of the preferred embodiment and the accompanying drawings in which.

Figure 1A:
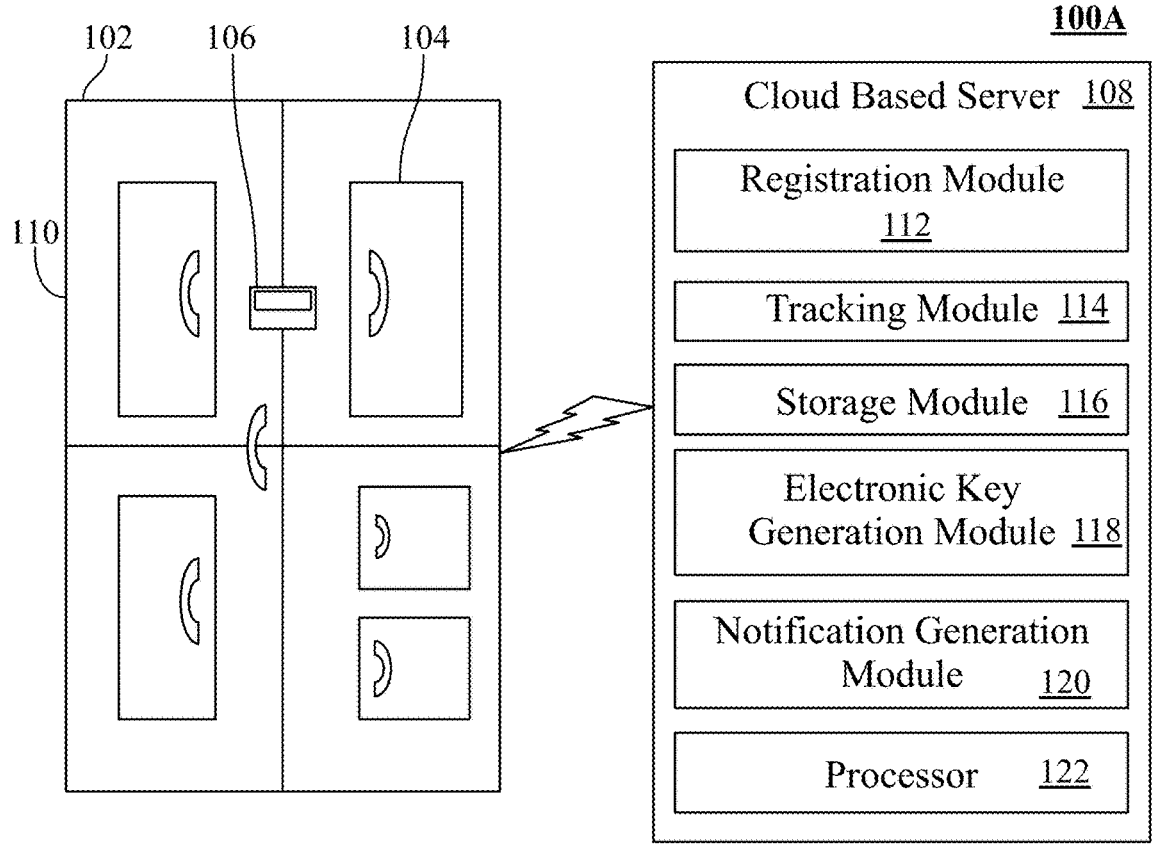
FIG. 1A illustrates a block diagram of the secured package delivery and pick-up system, according to one embodiment herein.

Although the specific features of the embodiments are shown in some drawings and not in others. This is done for convenience only, as each feature may be combined with any or all the other features in accordance with the embodiments herein.

DETAILED DESCRIPTION

In the following detailed description, a reference is made to the accompanying drawings that form a part hereof, and in which the specific embodiments that may be practiced is shown by way of illustration. These embodiments are described in sufficient detail to enable those skilled in the art to practice the embodiments and it is to be understood that the logical, mechanical and other changes may be made without departing from the scope of the embodiments. The following detailed description is therefore not to be taken in a limiting sense.

The various embodiments herein provide a secure package delivery and pick-up system. The system comprises a security door comprising a frame. The frame is configured for attaching to any firm surface of a building. The security door is configured for providing access to the building after successful verification of the user. The security door comprises one or more collapsible compartments affixed to the frame. Each collapsible compartment is configured for accommodating one or more packages meant for delivery or return pick-up. Each compartment comprises a series of four sided metal or wooden boxes with open ends designed to slide into one another in a telescopic manner to accommodate one or more packages. Both open ends of the compartment are secured using compartment doors for delivery and reception of the one or more packages respectively. The series of four sided metal or wooden boxes are configured for extending in a perpendicular direction to the length of the frame to achieve maximum storage size of the compartment and for contracting within each other to achieve a minimum size of the compartment. Each collapsible compartment comprises an external flange on the exterior side of the compartment and an internal flange on the interior side of the compartment for providing strength and support to the compartment in extended and collapsed state. The security door further comprises an electronic unit mounted on the frame. The electronic unit is configured for electronically controlling the operation of the one or more compartments for secure delivery or return pick-up of the one or more packages at unmanned locations.

According to an embodiment herein, the system further comprises a cloud based server comprising a registration module configured for registering one or more users with the system for operating the security door and the one or more compartments provided in the security door. The one or more users are registered with the system by providing a plurality of user details and the details of the one or more smartphones associated with each user. The one or more user details comprise name, address, contact numbers and biometric data. The server also comprises a storage unit configured for storing the plurality of user details, the details of the one or more smartphones associated with each user registered with the system and the GPS coordinates of the secured door. The server further comprises a tracking module configured for tracking the delivery and a pick-up activity of the one or more packages to an appropriate compartment. The server still further comprises an electronic key generation module configured for generating an electronic key for exchanging between the user and a delivery person for operating the compartment door. The server still further comprises a notification module configured for sending automatic notifications to the one or more users upon successful delivery or pick-up of the package.

According to an embodiment herein, the electronic unit comprises a control unit, a transceiver unit, a digital display, one or more cameras, a scanner unit, one or more sensors and a power unit.

According to an embodiment herein, the transceiver unit is configured for transmitting an electronic key entered by the user to verify with the server for operating the door or individual compartments. The transceiver unit is further configured for transmitting the information captured using one or more sensors.

According to an embodiment herein, the control unit is configured for controlling the opening and closing operations of appropriate compartment door on successful verification of secure electronic key.

According to an embodiment herein, the digital display is configured for displaying the video messages recorded by the user to the appropriate delivery person or vice-versa.

According to an embodiment herein, the one or more cameras are configured for recording activities in the vicinity of the security door on detecting any motion using motion sensors during any time of the day for security purpose.

According to an embodiment herein, the scanner unit is configured for scanning RFID tags of the parcel and the biometric data of the one or more users registered with each door for security purpose.

According to an embodiment herein, the one or more sensors are configured for detecting a plurality of parameters surrounding the door, and wherein the plurality of parameters comprises a motion detection in the vicinity of the door, International Mobile Equipment Identity (IMEI) number of the smartphone present in close vicinity of the door, smoke and fire.

According to an embodiment herein, the power unit is configured for supplying sufficient power required for operation of the door using one or more rechargeable batteries.

According to an embodiment herein, the system offers keyless entry through the door upon successful verification of the electronic key.

According to an embodiment herein, the system further comprises one or more multi-stage actuators and support guides for expansion and contraction of the one or more compartments. A power source used for the expansion and contraction of each compartment is either manual or electric.

According to an embodiment herein, the one or more compartments provided in the security door are customizable in capacity for accommodating one or more packages of different sizes and weights.

According to an embodiment herein, the system comprises a portal or platform for connecting one or more external Internet of Things (IOT) devices with the system, and wherein the one or more external IOT devices comprises camera, one or more sensors, communication modules.

According to an embodiment herein, the one or more compartments optionally comprise hot and cold boxes for storing hot or refrigerated products respectively.

According to an embodiment herein, the system is further configured for providing a mobile application for installing on the smartphone of the user, and wherein the mobile application is configured for enabling the user to remotely track the package delivery or pick-up activity, for viewing captured information from one or more IOT devices, for administration activity like adding/removing user and for exchanging secured electronic keys with the control unit.

According to an embodiment herein, the system is further configured for enabling the user to share the secured electronic keys with other users for a predetermined duration for accessing the building through the security door and for usage of the one or more compartments.

According to an embodiment herein, the mobile application provided to the user is configured for allowing the user to lock or unlock the security door or the individual compartments wirelessly from a remote location.

According to an embodiment herein, the system is further configured for enabling the user to remotely upgrade the software of the control unit to provide additional features and enhance security options.

Various terms are used to refer to particular system components. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect or direct communication between two or more elements, whether or not those elements are in physical contact with one another. Thus, if a first device couples to a second device, that connection may be through a direct connection or through an indirect connection via other devices and connections. The coupling can occur through two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely.

The terminology used herein is for the purpose of describing particular example embodiments only and is not intended to be limiting. As used herein, the singular forms "a," "an," and "the" may be intended to include the plural forms as well, unless the context clearly indicates otherwise. The method steps, processes, and operations described herein are not to be construed as necessarily requiring their performance in the particular order discussed or illustrated, unless specifically identified as an order of performance. It is also to be understood that additional or alternative steps may be employed.

The terms first, second, third, etc. may be used herein to describe various elements, components, regions, layers and/or sections; however, these elements, components, regions, layers and/or sections should not be limited by these terms. These terms may be only used to distinguish one element, component, region, layer, or section from another region, layer, or section. Terms such as "first," "second," and other numerical terms, when used herein, do not imply a sequence or order unless clearly indicated by the context. Thus, a first element, component, region, layer, or section discussed below could be termed a second element, component, region, layer, or section without departing from the teachings of the example embodiments. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C. In another example, the phrase "one or more" when used with a list of items means there may be one item or any suitable number of items exceeding one.

Various functions described below can be implemented or supported by one or more computer or microcontroller programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code including but not limited to source code, object code, and executable code. The phrase "computer readable medium" includes any type of medium capable of being accessed by a computer or microcontroller, such as read only memory (ROM), random access memory (RAM), a hard disk drive, a compact disc (CD), a digital video disc (DVD), or any other type of memory. A "non-transitory" computer or microcontroller readable medium excludes wired, wireless, optical, or other communication links that transport transitory electrical or other signals. A non-transitory computer or microcontroller readable medium includes media where data can be permanently stored and media where data can be stored and later overwritten, such as a rewritable optical disc or an erasable memory device.

In some embodiments, a security (delivery, package, object) device comprised of a microcontroller unit, a communication module, data storage memory, package detection system, and user interface provides data transfer through an Internet cloud based connection to both a customer interface device as well as a separate server (physical or cloud-based). The security device processes and stores the data/information and has access to the transferred data and other data stored on the physical server and customer interface device. The data transfer may include one or more planned or unplanned deliveries of a package or packages or any physical object. The data transfer may also include information regarding the actual delivery or deliveries of a package or packages or any type of physical object. The data transfer may also include an indication of unauthorized movement of the package or packages or any physical object. In one example embodiment, the data transfer includes an indication of the unauthorized movement of a bicycle, a bench, a potted plant, a statue, a vehicle (car, boat, motorcycle, camper, trailer, off-road vehicle, etc.) or some other decorative object on the porch of a location where the security device is located, or using a remote wireless camera device, an object remote from the security device. The data transfer may also include unauthorized movement of a gate, door or other entry way where the security device is located. The data transfer may also include audio and video information. The data transfer may occur not only between the security device and a customer interface device or physical server, but also between the customer interface device and the physical server through an Internet cloud-based connection, as well as, between the physical server through the Internet cloud-based connection to third-party interface devices or third-party physical servers.

The embodiments relate to item delivery and physical object security systems. Some embodiments provide a security device that includes a memory device including instructions. At least one processor is configured for executing the instructions to: receive images of at least one physical object from at least one camera connected to the at least one processor, receive an indication from at least one security tether indicating movement of the at least one physical object, and provide an alert based on the indication of movement of the at least one physical object.

One or more embodiments pertains to a secure package delivery and pick-up system that the system that includes a security door comprising a frame. One or more collapsible storage compartments are affixed to the frame. Each of the one or more collapsible storage compartments is configured for accommodating one or more packages. Open ends of the one or more collapsible storage compartments are secured using compartment doors. An electronic unit is mounted on the frame. The electronic unit is configured for electronically controlling an operation for the one or more collapsible storage compartments for secure delivery or return pick-up of the one or more packages. A security device is coupled to the security door. The security device includes a memory device having instructions, and at least one processor configured for executing the instructions to: receive images of at least one physical object from a first camera coupled to the at least one processor; receive an indication from at least one security tether indicating movement of the at least one physical object; and provide an alert based on the indication of movement of the at least one physical object.

Some embodiments pertain to a security device system that includes a security door comprising a frame, and one or more collapsible storage compartments affixed to the frame. Each of the one or more collapsible storage compartments is configured for accommodating one or more packages. The security door further includes an electronic unit mounted on the frame. The electronic unit is configured for electronically controlling an operation for the one or more collapsible storage compartments for secure delivery or return pick-up of the one or more packages. The system further includes a security device having first memory device including first instructions, and a first processor that is configured for executing the first instructions to: receive images of the at least one physical object from a first camera coupled to the first processor; receive an indication from at least one security tether indicating movement of the at least one physical object; and provide an alert based on the indication of movement of the at least one physical objects. The system additionally includes a customer interface that includes: a second memory device including second instructions; a second processor configured for executing the second instructions to: receive delivery details information; retrieve customer identification information; process the delivery details and customer identification information; and communicate the delivery details and the customer identification information through a first network to the security device and to a server.

FIG. 1A illustrates a block diagram of the secure package delivery and pick-up system, according to one embodiment herein. With respect to FIG. 1A, the system comprises a secure door 102, the one or more collapsible storage compartments 104, the electronic unit 106 and the cloud based server 108. The secure door 102 comprises a frame 110 configured for attaching to any firm surface of a building. The secure door 102 is configured for providing access to the building after successful verification of the user.

According to an embodiment herein, the system offers keyless entry through the secure door 102 upon successful verification of the electronic key. The one or more collapsible storage compartments 104 are affixed to the frame 110 of the secure door 102. Each collapsible storage compartment 104 is configured for accommodating one or more packages (not shown) meant for delivery or return pick-up. The one or more collapsible storage compartments 104 are customizable in size and capacity based on user requirement.

According to one embodiment, each storage compartment door (interior and exterior) comprises a handle for the user or delivery person to hold and operate the door. The one or more compartments are designed in a manner to accommodate a wide variety of items being placed inside for secure storage until such time that the receiver (either ingoing or outgoing) retrieve's the item/package. The wide variety of items include, but are not limited to, a package, groceries, food, hot or cold products, dry cleaning or even single items such as a set of keys, an envelope, or prescription medications and the like.

According to an embodiment herein, the cloud based server comprises the registration module 112, the tracking module 114, the storage module 116, the electronic key generation module 118, the notification generation module 120, and the processor 122. It should be noted that a module may be a hardware component, software component, or a combination thereof. The registration module 112 is configured for registering one or more users with the system for operating the secure door 102. The one or more users are registered with the system using a plurality of user details and the details of the one or more smartphones associated with each user. The one or more user details comprise name, address, contact numbers and biometric data and the like. The tracking module 114 is configured for tracking the delivery and pick-up activity of the one or more packages to an appropriate collapsible storage compartment 104. The storage module 116 is configured for storing the plurality of user details, the details of the one or more smartphones associated with each user registered with the system and the GPS coordinates of the secure door 102. The electronic key generation module 118 is configured for generation of an electronic key for exchanging between the user and the delivery person for operating a compartment door. The notification generation module 120 is configured for sending automatic notifications (e.g., communication messaging, alerts, etc.) to the one or more users upon successful delivery or pick-up of the package. The processor 122 is configured for processing requests received from any other modules and interacts with the storage module 116.

According to an embodiment herein, the electronic unit 106 is mounted on the frame 110. The electronic unit is configured for electronically controlling operation of the one or more collapsible storage compartments 104 for secure delivery or return pick-up of the one or more packages at unmanned locations. The electronic unit 106 is mounted at any convenient place on the secure door as per user requirement.

Figure 1B:
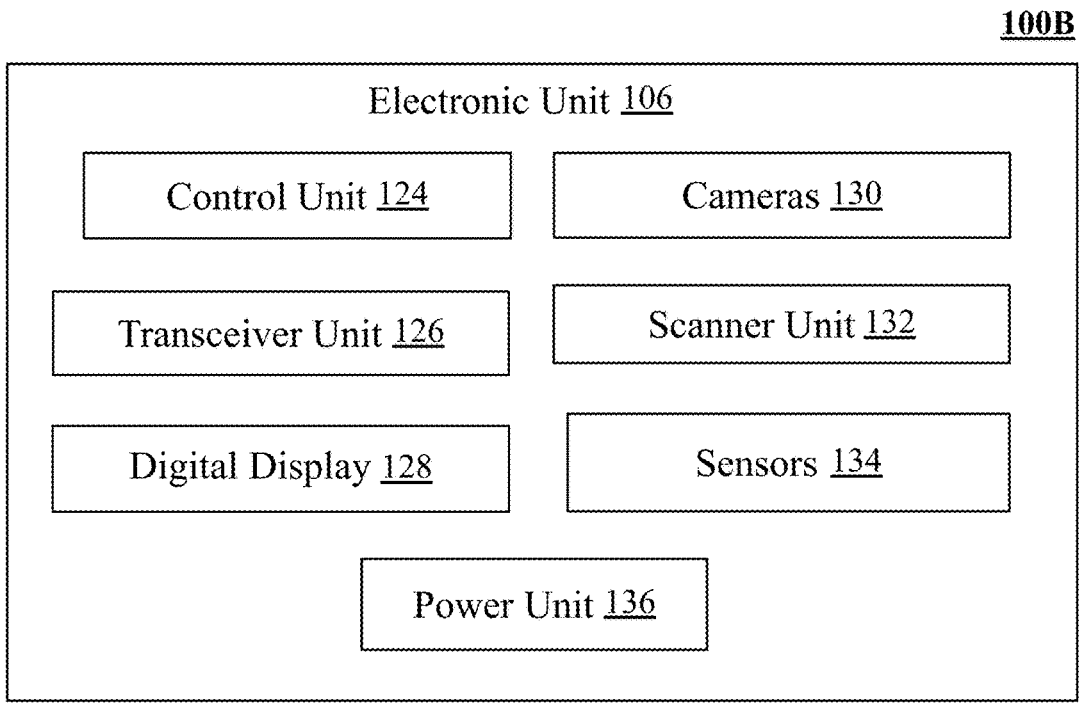
FIG. 1B illustrates the block diagram of the electronic unit provided in the secure door, according to one embodiment herein.

FIG. 1B illustrates the block diagram of the electronic unit 106 provided in the secure door, according to one embodiment herein. With respect to FIG. 1B, the electronic unit 106 comprises a control unit 124, a transceiver unit 126, a digital display 128, one or more cameras 130, a scanner unit 132, one or more sensors 134 and a power unit 136. The transceiver unit 126 is configured for transmitting an electronic key entered by the user to verify with the server for operating the secure door 102 or individual collapsible storage compartments 104. The transceiver unit 126 is further configured for transmitting the information captured using one or more sensors 134. The control unit 124 is configured for controlling the opening and closing operations of an appropriate compartment door on successful verification of secure electronic key. The digital display 128 is configured for displaying the video messages recorded by the user to the appropriate delivery person or vice-versa. The one or more cameras 130 (e.g. HD and night vision cameras) are configured for recording activities in the vicinity of the secure door 102 on detecting any motion using motion sensors any time of the day for security purpose. This is done for detecting any suspicious individual or activity in the vicinity of the secure door. The activity is captured while such individuals are unaware that they are being tracked. The scanner unit 132 is configured for scanning radio frequency identification (RFID) tags of the parcel/packages and the biometric data of the one or more users registered with each secure door for security purpose. The one or more sensors 134 are configured for sensing a plurality of parameters (or information) surrounding the secure door 120. The plurality of parameters (or information) may comprise motion detection in the vicinity of the secure door 102, IMEI number of the smartphone present in close vicinity of the secure door, smoke and fire detection, etc. The power unit 136 is configured for supplying sufficient power required for operation of the secure door 102 using one or more rechargeable batteries. In one example embodiment, a lithium ion battery inductive power supply is used.

Figure 2:
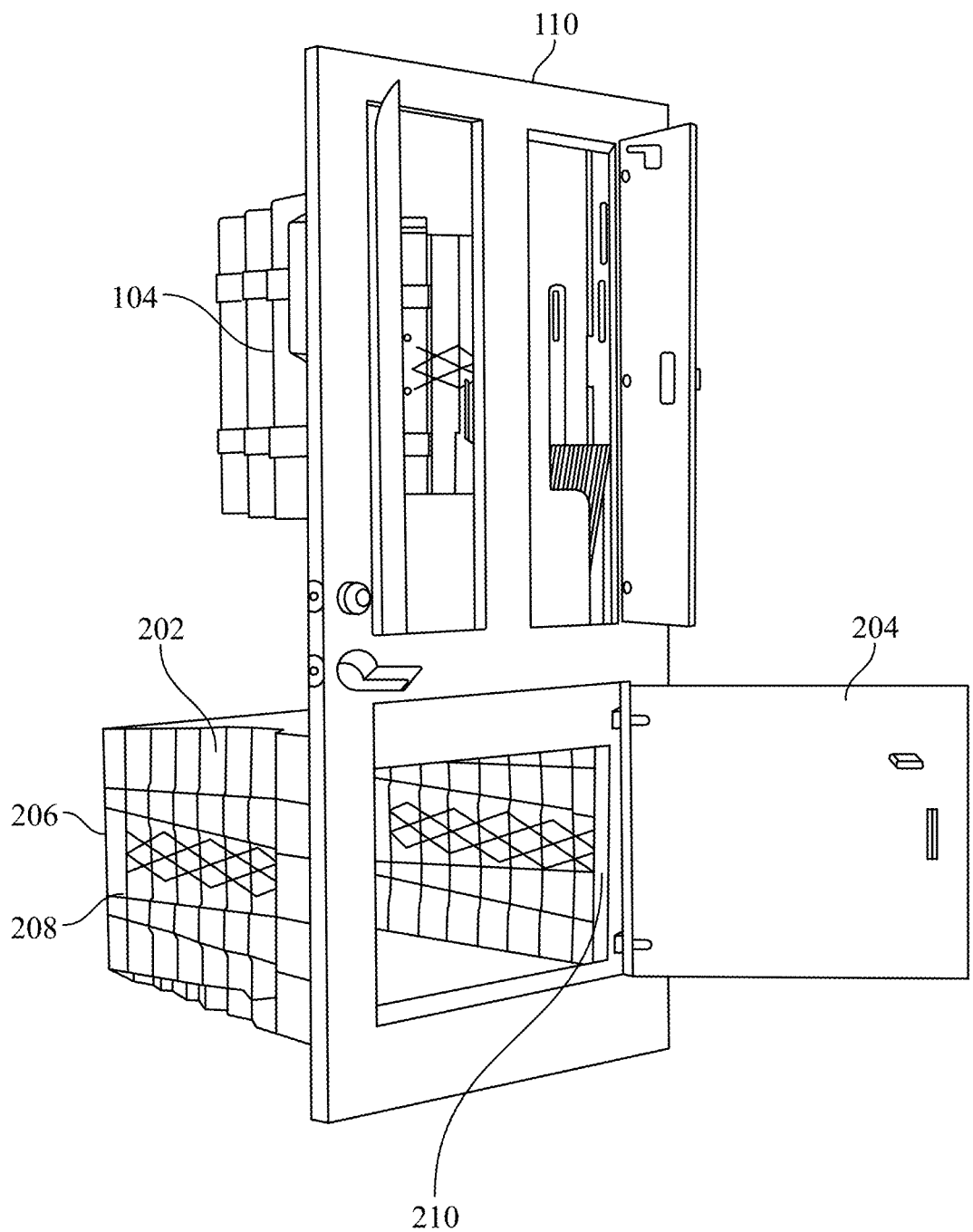
FIG. 2 illustrates a side perspective view of the security door fixed with a plurality of storage compartments/receptacles, according to one embodiment herein.

FIG. 2 illustrates a side perspective view of a security door 200 fixed with a plurality of storage compartments/receptacles, according to one embodiment herein. With respect to FIG. 2, each collapsible storage compartment 104 comprises a series of four sided metal boxes 202 with open ends designed to slide into one another in a telescopic manner to accommodate one or more packages. Both open ends of the collapsible storage compartment 104 are secured using compartment doors 204, 206 for delivery and reception of the one or more packages respectively. The series of four sided metal boxes 202 are configured for extending in perpendicular direction to the length of the frame 110 to achieve maximum storage size of the compartment and for contracting within each other to achieve minimum collapsed size of the compartment.

According to one embodiment herein, the one or more collapsible storage compartments 104 optionally comprise hot and cold boxes for safe keeping of hot or refrigerated products respectively. Each collapsible storage compartment 104 comprises an external flange 208 (attached at a 90 degree angle) on the exterior side of the compartment and an internal flange 210 (attached at a 90 degree angle) on the interior side of the compartment for providing strength and support to the compartment in extended and collapsed state. The external and internal flanges are also attached in a perpendicular direction of the length of frame 110.

According to an embodiment herein, the secure door 200 is easy to be installed in walls, fences, or various other substrate materials and structures. The installation process is done either by the user, handyman or any locally trained person. The secure door 200 is manufactured from industry standard materials in the exterior door segment that comprise all types of steel, fiberglass, wood, Masonite and even glass door systems. The material used for the manufacturing of one or more compartments comprise, but are not limited to, steel, metal alloy, aluminum, plastic, carbon fiber, and any other suitable substrate material that properly supports the weight and bulk of a placed item.

According to an embodiment herein, the individual compartments are installed in any type of exterior or interior wall systems, window cavities, or gate systems of buildings and do not need to be incorporated into a door. Furthermore, electronic unit in combination with such compartment provides the operational and communication system(s) that allows for the expansion and contraction of the compartment. The user is notified (e.g., via communication messaging, alerts, etc.) about successful deliveries made, as well as two-way communication between the user and the delivery person/firm is established.

Figure 3:
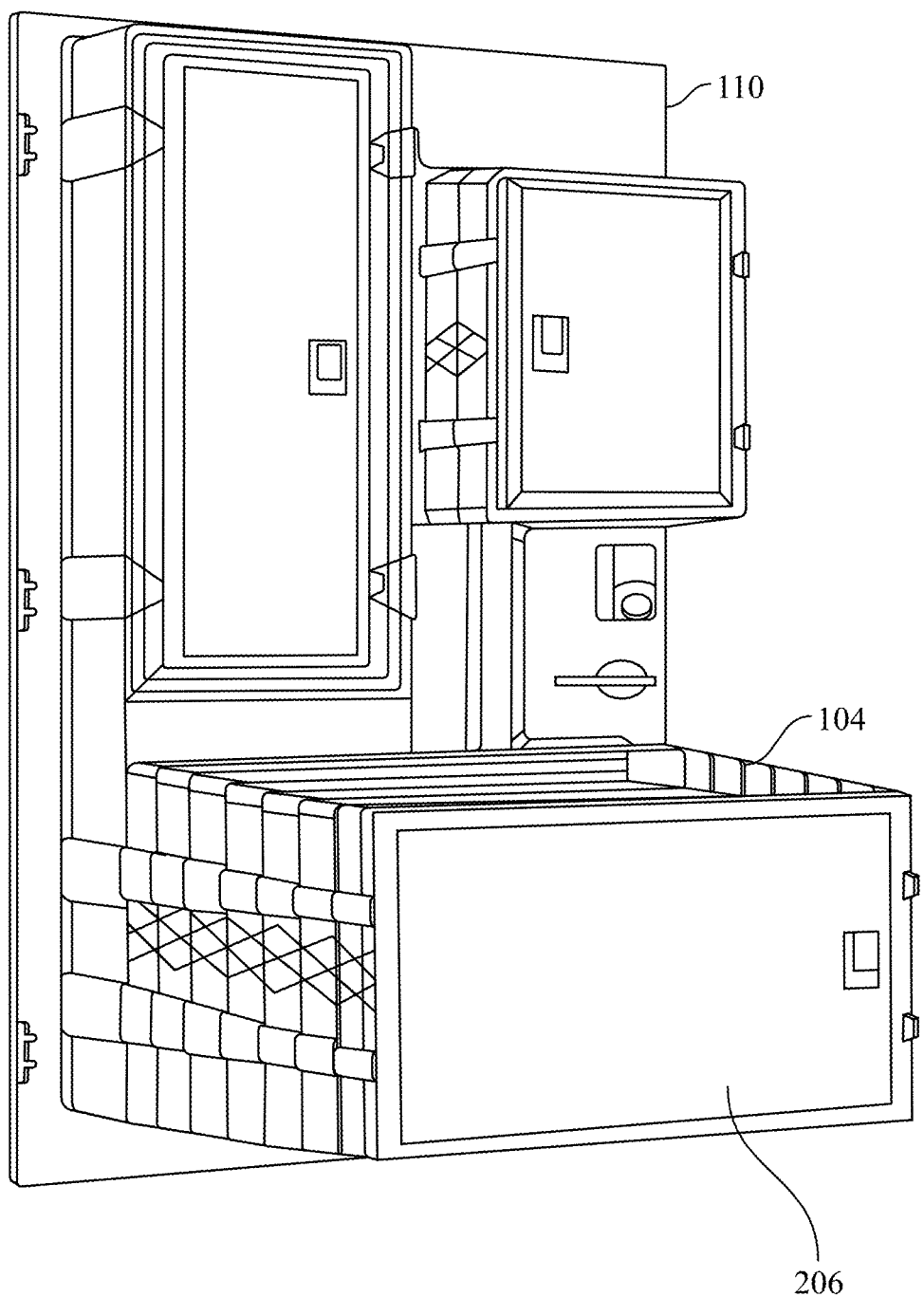
FIG. 3 illustrates a back side perspective view of the security door with the one or more storage compartments/receptacles in an expanded condition, according to one embodiment herein.

FIG. 3 illustrates a back side perspective view of a security door 300 with the one or more storage compartments/receptacles in an expanded condition, according to one embodiment herein. With respect to FIG. 3, the interior doors 206 of all collapsible storage compartments 104 are shown. The user operates the interior doors 206 individually for reception or return of the packages. The interior doors 206 are also operated by the user using secure electronic keys.

Figure 4A:
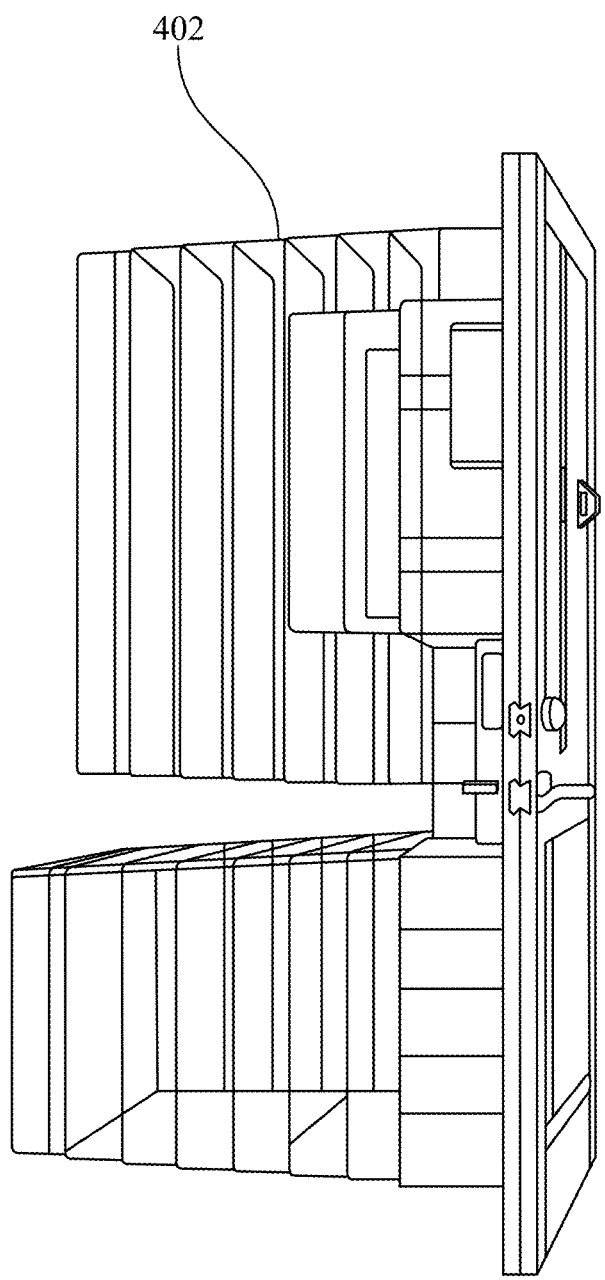
FIG. 4A and FIG. 4B illustrate a side view of the security door with the one or more storage compartments/receptacles in expanded and collapsed conditions respectively, according to one embodiment herein.
Figure 4B:
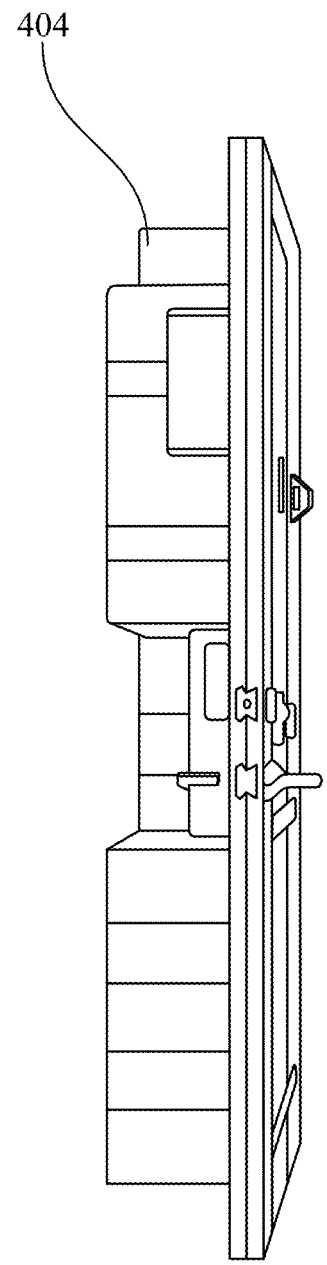

FIG. 4A and FIG. 4B illustrate a side view of a security door 400 with the one or more storage compartments/receptacles in expanded and collapsed conditions respectively, according to one embodiment herein. With respect to FIGS. 4A-B, the one or more collapsible storage compartments are shown in expanded (402) and contracted conditions (404) respectively. The system comprises one or more multi-stage actuators (not shown) and support guides (not shown) for expansion and contraction of the one or more compartments.

According to one embodiment herein, scissor hinges and supporting rods are used for accomplishing expansion and contraction operation in combination with linear actuators. The scissor hinges and supporting rods provide linear support during the course of movement and static positions. An interior hinged base provides support for the placement of an item/package once the complete expansion is accomplished. A power source used for the expansion and contraction of each compartment is either manual or electric.

According to one embodiment herein, sidewalls and/or bellows are utilized as exterior covering of the interior components that operate the expansion and contraction of each compartment.

According to one embodiment herein, manual operation of the one or more storage compartments is accomplished through a separate design which includes springs and hinges and does not require an electric motor or linear actuators.

Figure 5:
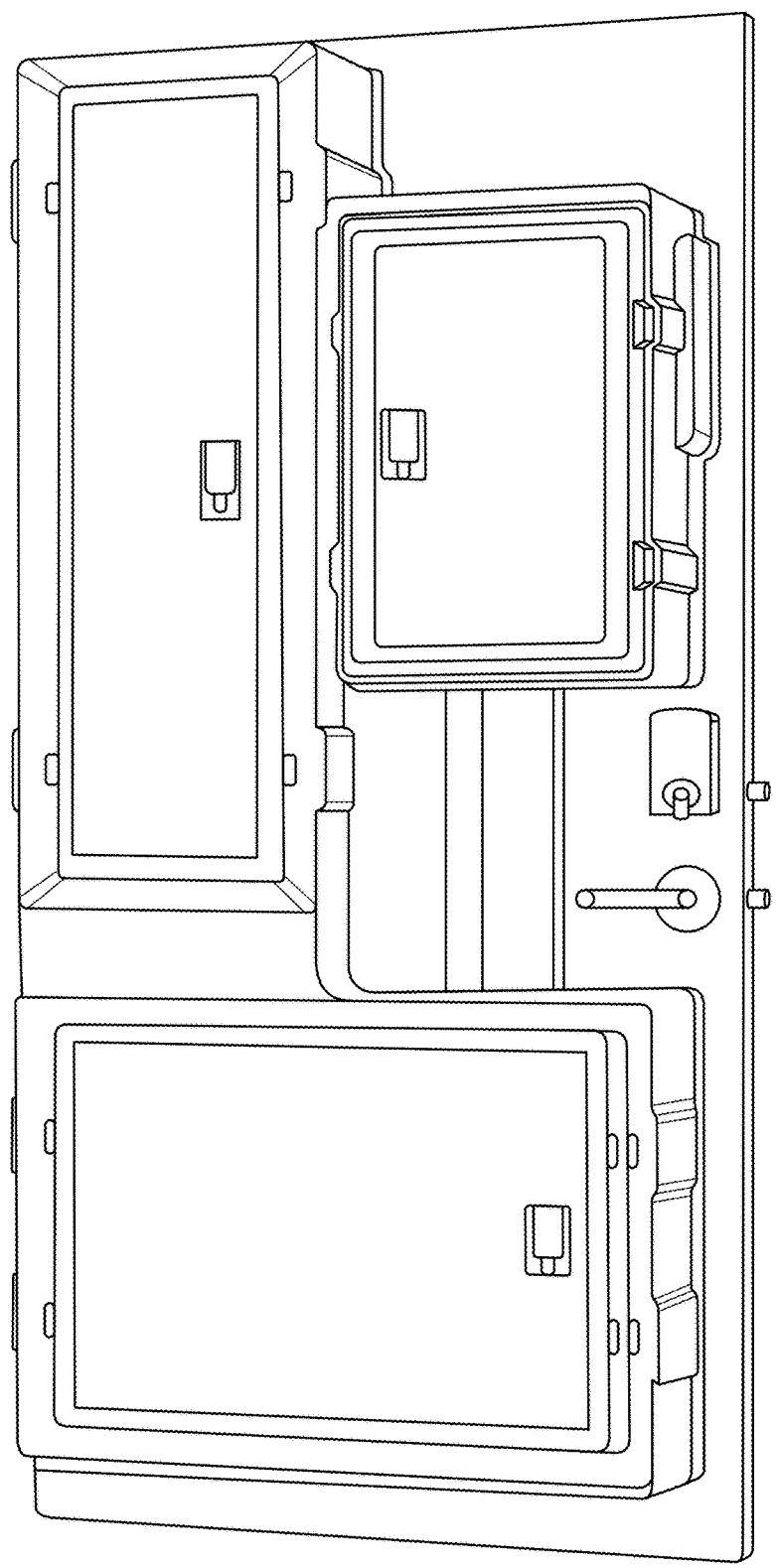
FIG. 5 illustrates a back side view of the security door with the one or more storage compartments/receptacles in collapsed condition, according to one embodiment herein.

FIG. 5 illustrates a back side view of a security door 500 with the one or more storage compartments/receptacles in collapsed condition, according to one embodiment herein. With respect to FIG. 5, the back side view of the secure door 500 with all the compartments in contracted condition is shown.

Figure 6A:
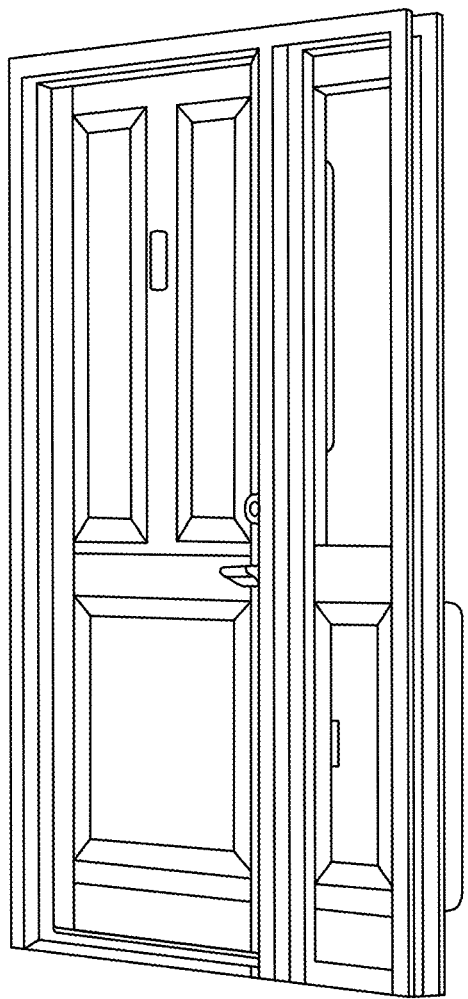
FIG. 6A and FIG. 6B illustrate a front side view and a back side view of the security door fixed with a plurality of storage compartments/receptacles, according to one embodiment herein.
Figure 6B:
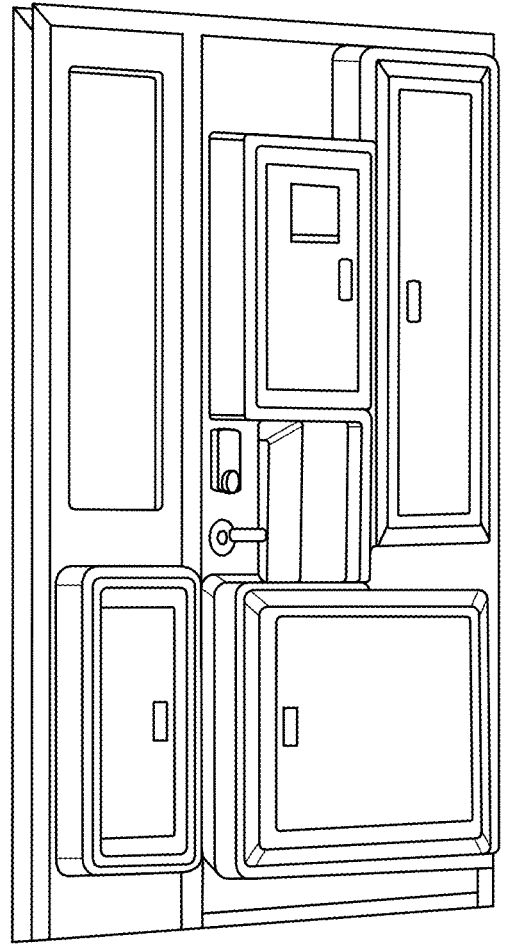

FIG. 6A and FIG. 6B illustrate a front side view and a back side view of a security door 600 fixed with a plurality of storage compartments/receptacles, according to one embodiment herein. With respect to FIG. 6A and FIG. 6B, the security door 600 comprises four collapsible storage compartments of varying sizes.

Figures 7A, 7B:
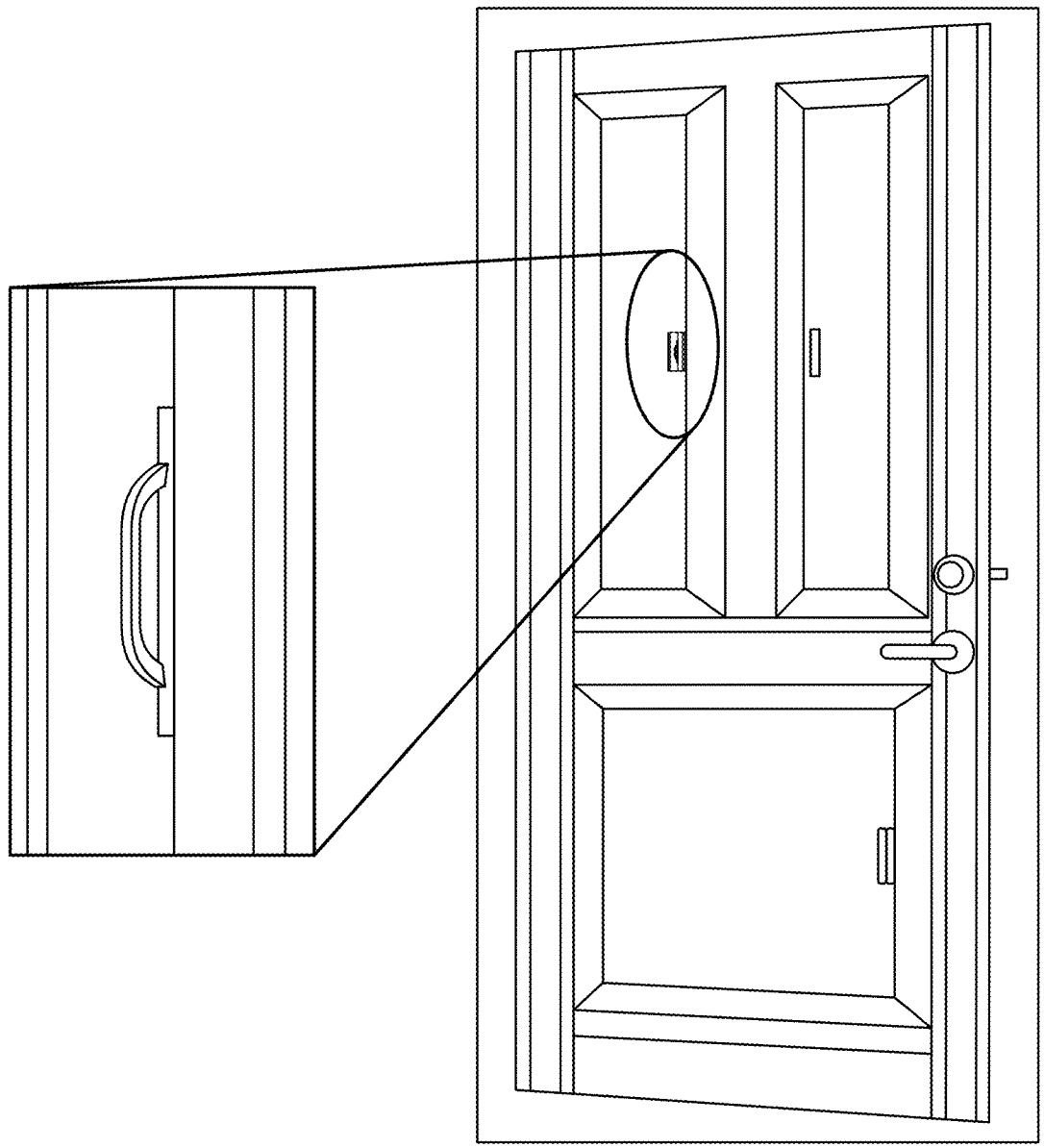
FIG. 7A and FIG. 7B illustrate a front side view of the security door with a handle comprising biometric sensor and an enlarged and magnified view of the handle with biometric sensor respectively, according to one embodiment herein.

FIG. 7A and FIG. 7B illustrate a front side view of a security door 700 with a handle comprising biometric sensor (e.g., fingerprint, retinal recognition, facial recognition, etc.) and an enlarged and magnified view of the handle with biometric sensor respectively, according to one embodiment herein. With respect to FIG. 7A and FIG. 7B, the handles provided for operating one or more compartments in the secure door 700 comprise biometric sensors to capture biometric data of the delivery person operating the secure door 700.

Figure 8:
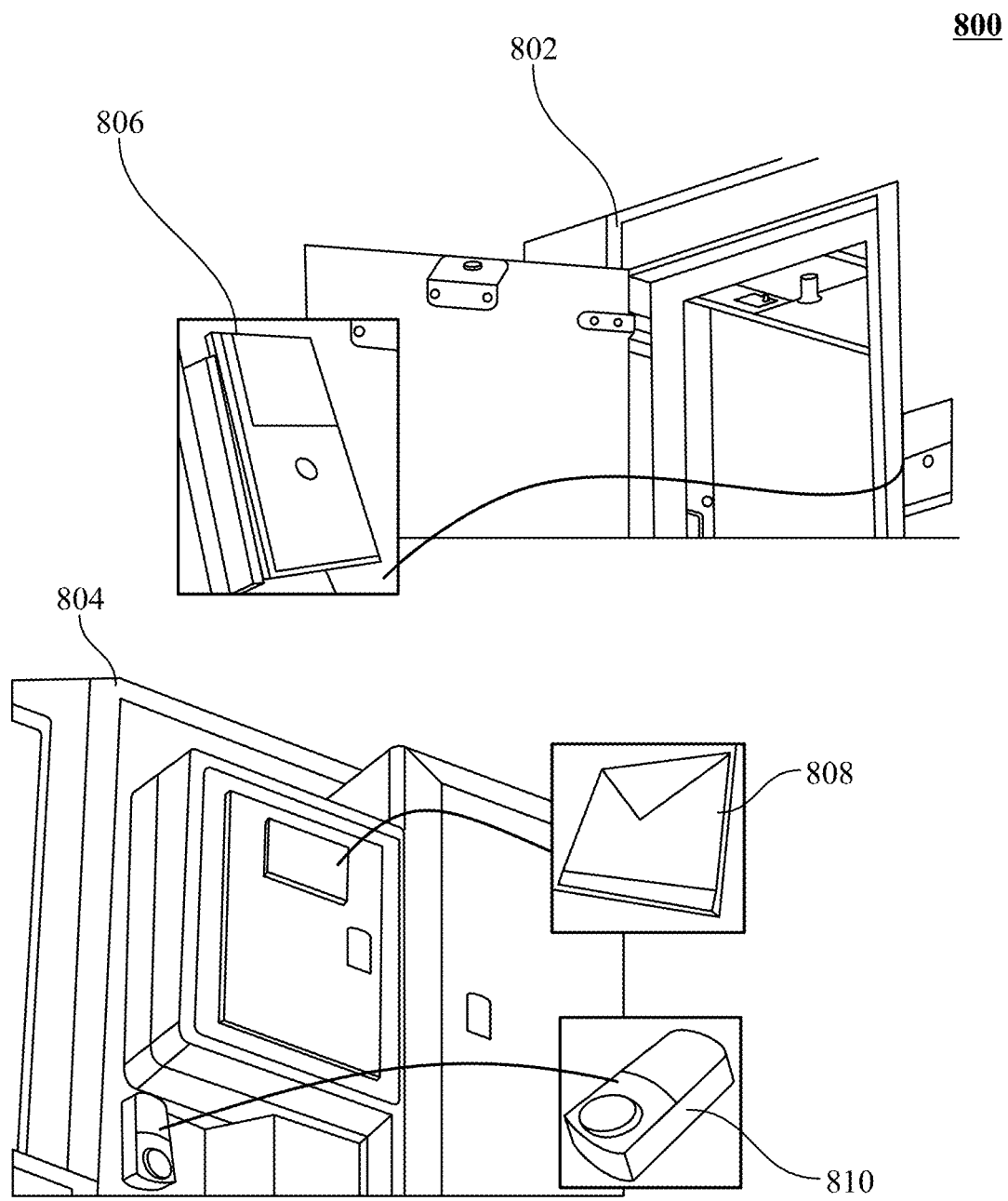
FIG. 8 illustrates a back side view of the security door fixed with an electronic unit and locking system, according to one embodiment herein.

FIG. 8 illustrates a back side view of a security door 800 (fixed to a frame 802) including an electronic unit 806 and locking system, according to one embodiment herein. With respect to FIG. 8, the audiovisual unit 806, the display unit 808 and the locking mechanism 810 are shown.

According to an embodiment herein, the system comprises an Internet of Things (IOT) expandable platform for connecting one or more external IOT devices with the system, for providing programmable and manual emergency contact with on-site and remote access, notifications and various other control options. The one or more external IOT devices comprises wireless exterior and interior cameras, one or more sensors (such as door and window sensors, smoke and fire sensors, etc.), communication devices and/or modules and the like.

According to an embodiment herein, the system is further configured for providing a mobile application for installing on the smartphone of the user. The mobile application is configured for enabling the user to remotely track the package delivery or pick-up activity, for viewing captured information from one or more IOT devices, for administration activity like adding/removing user and for exchanging secure electronic keys with the control unit 124 (FIG. 1B). The mobile application provided to the user is configured for allowing the user to lock or unlock the secure door or the individual compartments wirelessly from a remote location. The system is further configured for enabling the user to remotely upgrade the software of the control unit to provide additional features and enhance security options. The system is further configured for enabling the user to share secure electronic keys with other users for a predetermined duration for accessing the building through the secure door and for usage of the one or more compartments. All users who are given access of the secure door have their smartphone identification IMEI number registered and archived via the server storage and all the activities are tracked and retrieved.

According to an embodiment herein, exact GPS coordinates of the secure door are registered with the system. This information is shared with the delivery person with every electronic key to ensure timely delivery with no possibility of incorrect or un-traceable address or location.

Therefore, the secure package delivery and pick-up system makes receiving and sending of packages easy and simple using a modular platform. The system includes two-way high definition (HD) and night vision camera(s) and communication system; keyless entry system; wireless power system, IOT expandable platform etc. The system offers a wide choice of integrated electronic secure door configurations, sizes and options to accommodate packages of any size and weight.

The system is easy to install and provides utmost protection of the packages form theft or damages due to weather conditions. The system is highly secure as several security measures (such as RFID, biometric data, electronic key exchange, mobile IMEI identification, etc.) are considered for the delivery and pick-up of packages.

Figure 9:
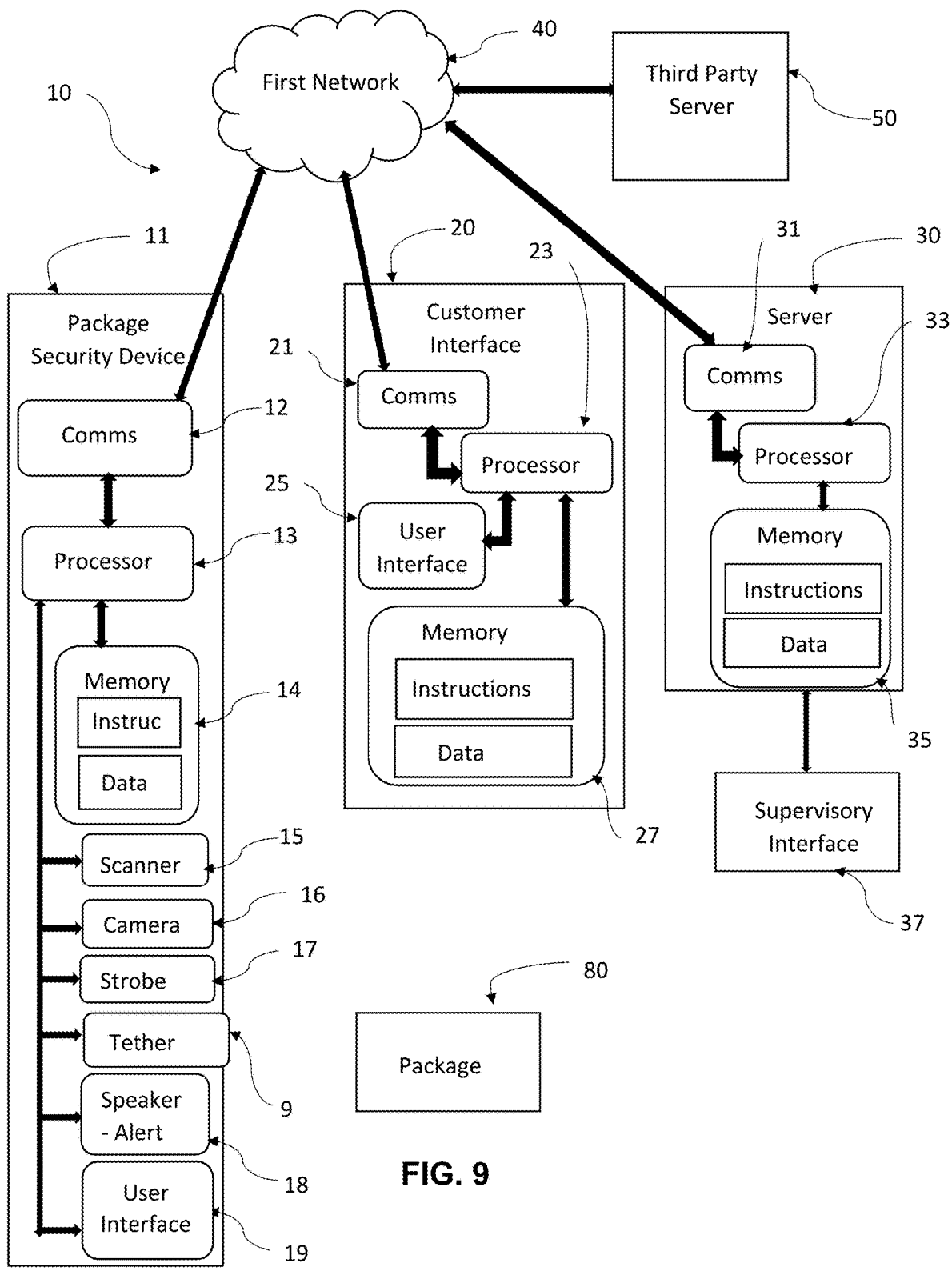
FIG. 9 illustrates a block diagram of a system including a security device, according to one or more embodiments.

FIG. 9 illustrates a block diagram of a system 10 including a (delivery, package, object) security device 11, according to one or more embodiments. In some embodiments, the security system 10, hereinafter referred to as "the system", assists in securing one or more packages 80. The security device 11 includes one or more communication devices or modules (or comms) 12 that transfers data via a first network 40 (e.g., the Internet, a local area network (LAN), a wide area network (WAN), a private network, etc. The data may be transferred via Wi-Fi, BLUETOOTH®, ZIGBEE®, Near-Field Communications (NFC), cellular data network, etc. The security device 11 further includes one or more processor devices 13, such as a microprocessor, computer device, microcontroller, etc., that is/are configured to receive and process data from the communication device 12 as well as to receive data from a variety of subsystems, including but not limited to a scanner 15, one or more cameras 16, a user interface 19 and one or more tethers 9 (physical, virtual, or both). The security device 11 also includes a memory storage device or module 14 (e.g., read-only memory (ROM), flash memory, dynamic random access memory (DRAM) such as synchronous DRAM (SDRAM)), a static memory (e.g., flash memory, static random access memory (SRAM), etc.) for storing data and instructions for performing various actions of the security device 11 for execution by the one or more processor devices 13.

In one or more embodiments, the security device 11 may be powered by a direct line (wired), with one or more disposable batteries, with one or more rechargeable batteries that are either removed from the security device 11 and placed in a charger, or a charger may be plugged into the security device 11 to recharge the one or more batteries. In some embodiments, upon removal of the one or more batteries from the security device 11 for recharging, another battery or second set of batteries may be supplied to continue powering the security device 11 during recharging of the initial one or more batteries. The security device 11 may also be configured with a solar electric panel(s) or solar cell that converts light into electricity to recharge the one or more batteries. The scanner 15 may be a bar code reader, a quick response (QR) code scanner, any similar type of code scanning device, a radio frequency identification (RFID) receiver/transceiver, etc. The scanner 15 is configured to read a code included on a shipping label of a delivery, such as on the one or more packages 80 (e.g., any type or sized delivery box, package, etc.), or receive an RFID attached/embedded for the one or more packages 80. The one or more cameras 16 may include one or more: still picture cameras, video cameras, etc. In some embodiments, the one or more cameras 16 may include a portable camera device that communicates with the comms 12 to provide data and information to capture remote images of a physical object or area. In some embodiments, the one or more cameras 16 are configured to capture images in the area adjacent the security device 11, particularly pictures/photos of the one or more packages 80 and anyone or device (e.g., delivery vehicle, such as a drone, wireless controlled vehicle, etc.) delivering or retrieving one or more packages 80.

In one or more embodiments, the user interface 19 may be in the form of a video display (e.g., a liquid crystal display (LCD) or a cathode ray tube (CRT)), a touch display (or resistive digitizer), one or more input devices (e.g., a keyboard and/or a mouse), one or more speaker devices, one or more microphones (e.g., a microphone), a natural language understanding (NLU) or natural language processing (NLP) device, gesture recognition device, etc. In one illustrative example, the customer interface 20 can be both a display(s) and input device(s) that are combined into a single component or device (e.g., an LCD touch screen). The user interface 19 can also be comprised of a button or similar device that is wired to ring a bell such as a doorbell for the address where the security device 11 is installed. In some embodiments, the one or more tethers 9 may be a physical tether device, a virtual tether target or zone, or both. A physical type of tether 9 is described in more detail below. A virtual tether 9 may be one or more visual light cameras, infrared light cameras, motion sensors, depth cameras (e.g., MICROSOFT® AZURE®), portable cameras, etc., or any combination thereof. In some embodiments, the virtual tether 9 may include use of light pulses, heat or thermal measurements, radio waves, etc., to detect motion. Using the one or more cameras 16, Passive infrared (PIR) sensors may be employed to monitor for ambient heat that is emitted by people, animals, etc. A PIR sensor detects movement of warm "objects" and/or a temperature differential between the object and the background scene. In some embodiments, the sensed differential may be used to signal the one or more cameras 16 to commence recording and an alert (e.g., via an app on a smart device (e.g., smartphone, computing pad, etc.), email, text message, cellular message, a wireless remote device (e.g., a fob, remote control, etc.) may be sent to the user. In some embodiments, computer vision (CV) may be employed for virtual tether 9. Computer vision uses software of the one or more cameras 16 for analyzing sequential frames of a live video feed for differences, and registers a motion event when a large enough change is detected. In one embodiment, a significant change in pixels over short periods of time are used for comparison to the longer term average to determine that something may have occurred. In another embodiment, CV may track groups of pixels and identify directional patterns, e.g., there was a particular dot one frame ago, but now there is the dot and one pixel to the left (e.g., and analysis may be employed to recognize moving objects). CV attempts to detect motion and possibly determine the shape of the object that moved (e.g., for comparison to known shapes or outlines). In some embodiments, advanced methods may be added to classify the moving object, (e.g., a person, an animal, a vehicle, a flag moving, etc.) in order to determine which detection signals are important to the user and which are irrelevant and should be ignored (e.g., animals, flags, trees, etc.). Whether the tether 9 is virtual or physical, it detects unauthorized movement of the one or more packages 80.

In some embodiments, the security device 11 may be configured with one or more strobe or visible alerts 17, such as light emitting diodes (LEDs) of any color, combination of colors or selected colors, strobe lights, etc., as well as one or more speaker or audible alerts 18 (e.g., transducer, loudspeaker, an alarm bell, etc.). The visible alerts 17 and audible alerts 18 are connected to the one or more processor devices 13 such that the one or more processor devices 13 activate the audible alerts 18 and visible alerts 17 upon the tether 9 detecting unauthorized movement of the package (or other physical objects) 80, and sends the information or data to the one or more processor devices 13. The one or more processor devices 13 may also activate the one or more cameras 16 to record the unauthorized movement of the one or more packages 80. The visible alerts 17 and audible alerts 18 may be configured to activate at a very high level of light and sound when the one or more tethers 9 detect unauthorized movement of the one or more packages or other physical objects 80 in order to both alert the owner (or authorized person or robotic device) of the security device 11 of the unauthorized movement, as well as to alarm, scare off or dissuade the person or device that is causing the unauthorized movement. The visible alerts 17 and audible alerts 18 may be configured to activate at a low level of light and sound when the security device 11 receives information of a pending delivery from a customer interface 20 or a server 30 as described herein in order to provide visible and audible guidance to the delivery person or device and to ensure a timely and accurate delivery.

In one or more embodiments, the system 10 includes a customer interface 20 including one or more communication devices or modules (or comms) 21 configured to send commands to the security device 11, and receive and send data (or information) related to the system 10. The customer interface 20 may include one or more processor devices or modules 23 such as one or more microprocessors, computers, microcontrollers, etc., that are configured to receive data and process data from the comms 21 as well as from a machine-readable storage memory 27 (e.g., ROM, flash memory, DRAM, SDRAM), a static memory (e.g., flash memory, SRAM), etc.). The memory 35 may include both instructions and data. The one or more communication modules 31 are also configured for transferring data to and from the server 30.

In one or more embodiments, the supervisory interface 37 may also include a user interface 25, which may be in the form of a video display (e.g., an LCD or CRT), a touch display (or resistive digitizer), one or more input devices (e.g., a keyboard and/or a mouse), one or more speaker devices, one or more microphones (e.g., a microphone), an NLU/NLP device, gesture recognition device, etc. In one illustrative example, the customer interface 20 may be both a display(s) and input device(s) that are combined into a single component or device (e.g., an LCD touch screen, etc.). The customer interface 20 may be a personal computer (PC), a tablet computer, a wearable (e.g., wristband, pendant, etc.), a set-top box (STB), a personal Digital Assistant (PDA), a mobile phone, a camera, a video camera, or any device capable of executing a set of instructions (sequential or otherwise) that specify actions to be taken by that device. The customer interface 20 may be powered by a direct line (wired), with one or more disposable batteries, one or more rechargeable batteries, etc.

In some embodiments, the system 10 includes a server 30 that may take the form of a distributed and/or virtualized computer or computers. The server 30 includes a first communication interface (or comms) 31 configured to communicate with the customer interface 20 and the security device 11 via the first network 40. In some embodiments, the first network 40 may include wired and/or wireless network connections. The server 30 includes a one or more processor devices 33 and a one or more machine-readable storage memory devices 35, which may be referred to as a "memory," that stores instructions for performing the various actions of the server 30 for execution by the one or more processor devices 33. The one or more processor devices 33 represent one or more general-purpose processing devices such as a microprocessor, microcontroller, CPU, or the like. On one embodiment, the one or more processor devices 33 may be a complex instruction set computing (CISC) microprocessor, reduced instruction set computing (RISC) microprocessor, very long instruction word (VLIW) microprocessor, a processor implementing other instruction sets or processors implementing a combination of instruction sets, etc. In some embodiments, the one or more processor devices 33 may also be one or more special-purpose processing devices such as an application specific integrated circuit (ASIC), a field programmable gate array (FPGA), a digital signal processor (DSP), network processor, etc. The one or more processor devices 33 execute instructions for performing any of the operations and processing discussed herein. The memory 35 may take the form of any type of machine-readable storage memory (e.g., ROM, flash memory, DRAM, SDRAM, a static memory (e.g., flash memory, SRAM, etc.), and a data storage device, which communicate with each other via a bus. While the memory 35 is shown in the illustrative examples to be a single medium, the term "memory" should be taken to include a single medium or multiple media (e.g., a centralized or distributed database, and/or associated caches and servers) that store the one or more sets of instructions. The term "memory" shall also be taken to include any medium that is capable of storing, encoding or carrying a set of instructions for execution by the machine and that cause the machine to perform any one or more of the methodologies of the present disclosure. The term "memory" shall accordingly be taken to further include, but not be limited to, solid-state memories, optical media, magnetic media, etc.

In some embodiments, the server 30 may include one or more servers 30 that form a distributed computing architecture. Each of the servers 30 may include one or more processing devices, memory devices, data storage, and/or network interface cards. The servers 30 may be in communication with one another via any suitable communication protocol. In one or more embodiments, the server 30 may include a supervisory interface 37. The supervisory interface 37 also may include a video display (e.g., an LCD, CRT, etc., one or more input devices (e.g., a keyboard and/or a mouse)), and one or more speakers or equivalent. In one illustrative example, the video display and the input device (s) may be combined into a single component or device (e.g., an LCD touch screen, etc.). The supervisory interface 37 may be used to upload information to the memory 35 or to retrieve data from the memory 35. The supervisory interface 37 may be used to update or modify instructions stored in the memory 35 executed by the one or more processor devices 33 or to review instructions previously executed by one or more processor devices 33 that have been stored in the memory 35.

In one or more embodiments, the system 10 may be connected via the first network 40 to a third-party server 50. The first network 40 may be a public network (e.g., connected to the Internet via wired (e.g., Ethernet, etc.) or wireless (Wi-Fi, etc.)), a private network (e.g., a LAN, WAN, WLAN, etc.), or a combination thereof. The third-party server 50 may be configured to conduct a variety of processes including, but not limited to, receiving an address and delivery instructions associated with the security device 11 on a mapping database of the third-party server 50. For example, in one embodiment the third-party server 50 may be a commercially available mapping system that is commonly used by consumers and businesses to locate an address. In another embodiment, the third-party server 50 may be a private mapping system that is commonly used by a business to allow their employees to locate an address. These businesses may include, but are not limited to, a delivery service, a car share service, a food delivery service (e.g., from a restaurant, a convenient store, a supermarket, etc.), a car ride service, a document delivery service, mail delivery, an emergency service such as the police or sheriff's department, the fire department, an ambulance service, etc. It can be appreciated that using the system 10 to send an address and delivery instructions associated with the security device 11 may be very helpful in enabling business services, and even friends and family of the customer or business owner at that address in physically locating the address and delivering a package 80 to that location in a secure manner. This may be particularly beneficial in ensure timely, accurate, and secure delivery in locations that are not easily identified and distinct such as, but not limited to, apartment buildings, shopping centers, gated complexes, rural areas, etc.

Figure 10:
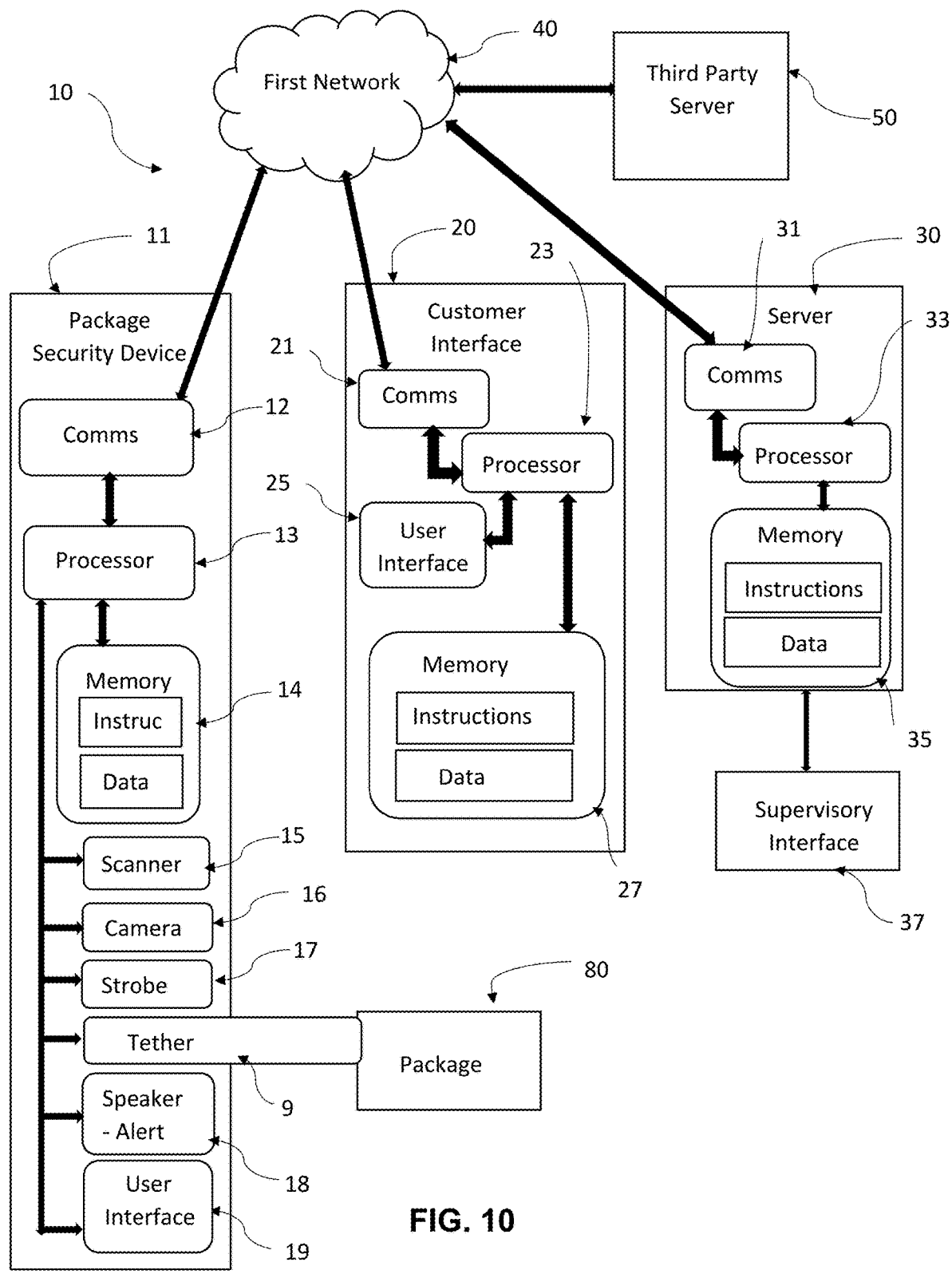
FIG. 10 illustrates a block diagram of another system including a security device, according to one or more embodiments.

FIG. 10 illustrates a block diagram of another system 10 including the security device 11, according to one or more embodiments. For one or more embodiments, the system 10 has all the elements as described above regarding the system 10 of FIG. 9. In one example embodiment, the tether 9 is a physical tether that extends from the security device 11 and attaches to the package 80. In some embodiments, the physical tether 9 includes a retractable cable with a package attachment element at one end and attachment to the security device 11 at the other end. In one embodiment, the retractable cable is replaceable due to normal wear, for another cable in another color, a longer cable, etc. In one or more embodiments, the tether 9 can be attached to the package 80 by way of a clip at the end of the tether 9 that can grab a hold of a portion of the package 80. In other embodiments, the physical tether 9 may also be attached to the package 80 by other elements located at the end of the tether 9 including, but not limited to, an adhesive surface, a barbed spike, a magnet (e.g., a ferrite magnet, Neodymium magnet, etc.) a set of magnets, a hook device, a net or similar element that wraps around all or a portion of the package 80, etc. Any one of these or other elements may be used to secure the tether 9 to the package 80. The package attachment may be configured with a motion sensor, an accelerometer sensor, a gyroscope, or a combination thereof. Any of these types of sensors may include internal wires to enable the physical tether 9 to send data/information to the one or more processor devices 13 regarding unauthorized movement of the package 80 in order to set off the visible alerts 17, audible alerts 18, and or the one or more cameras 16 in order to deter the unauthorized movement and secure the package 80. In addition, the sensor(s) in the package attachment may be wirelessly connected to the one or more processor devices 13 to send/transmit data, information or a combination thereof regarding unauthorized movement of the package 80 or the tether 9 itself.

In some embodiments, the physical tether 9 may be a mat, pad or platform that is connected to the security device 11 either by a wired and/or wireless network connections such as Wi-Fi, BLUETOOTH®, ZIGBEE®, NFC, cellular data network, etc. The tether 9 as a mat, pad or platform may rest on any flat (or mostly flat) surface and detect the weight or mass of the package 80 that has been delivered and detect changes in the weight or mass of the package 80 after delivery and send that data or information to the one or more processor devices 13 in order to activate or set off the visible alerts 17, audible alerts 18, and or one or more cameras 16 to deter the unauthorized movement and secure the package 80.

Figure 11:
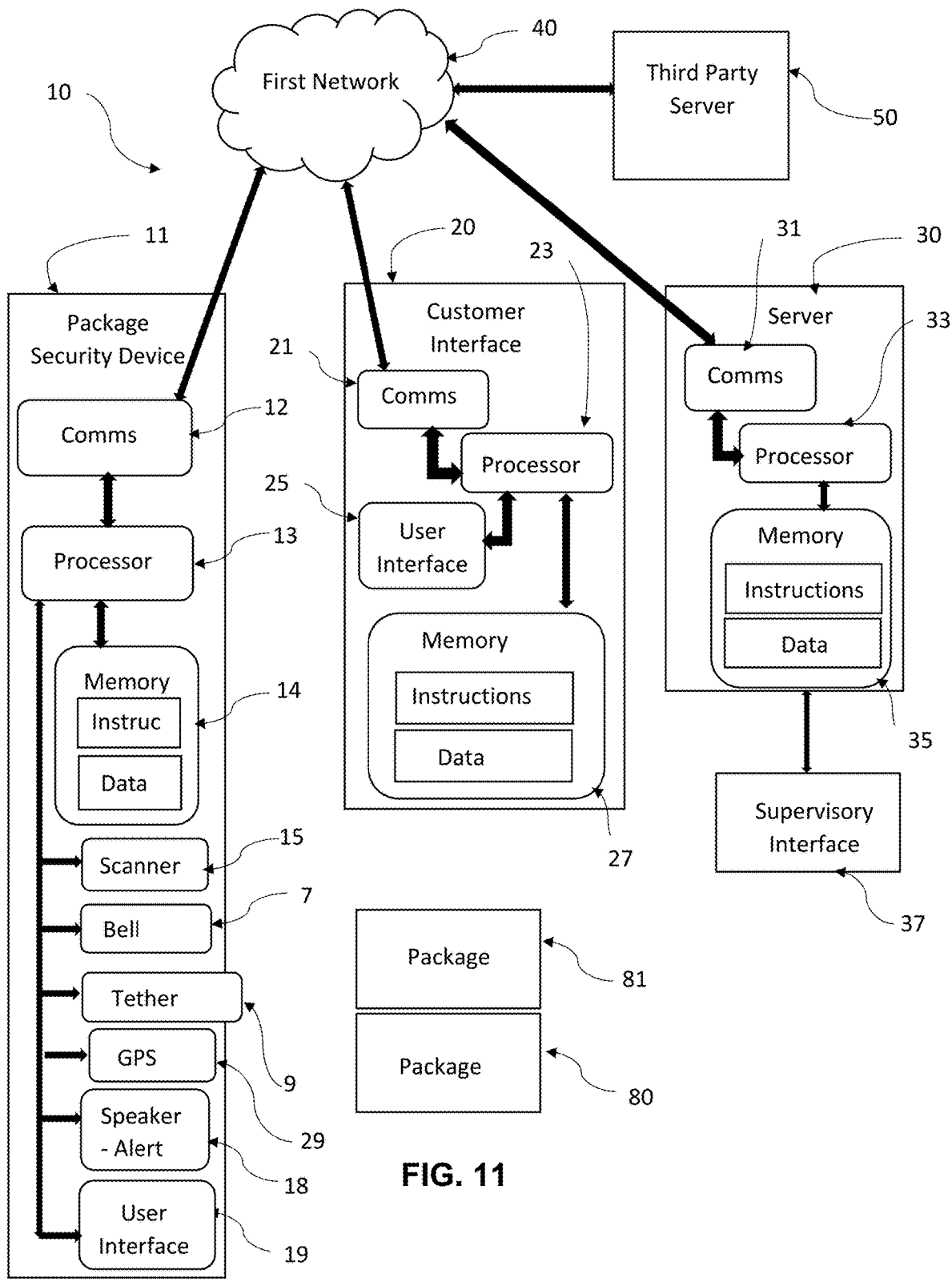
FIG. 11 illustrates a block diagram of an embodiment of a system for security of multiple packages, according to one or more embodiments.

FIG. 11 illustrates a block diagram of an embodiment of system 10 for security of multiple packages 80, 81, according to one or more embodiments. This embodiment has all the elements described in the embodiments described with regard to FIG. 9. In some embodiments. the tether 9 is configured to secure package 80 and package 81. Package 80 may be delivered at Time A wherein the security device 11 is configured by the customer interface 20 to receive package 80 by providing instructions via the user interface 19 to the delivery person or device to scan the package code with the scanner 15. After the package code is scanned with the scanner 15, the package information is confirmed with instructions received from the customer interface 20 or the server 30. The user interface 19 then provides instructions to the delivery person or device including information as to where to place the package 80 such that the tether 9 is armed when attached to a physical tether 9 or a zone is turned on for a virtual tether 9. For the virtual tether 9, these instructions may include an image of the area in front of the security device 11 indicating a highlighted location for placing the package 80 (e.g., for optimal visualization via the one or more cameras 16, for optimal concealment, if possible, clear line of sight, reduced physical interference, etc.). For the virtual tether 9, these instructions may also include projecting a zone onto the area in front of the security device 11 by using the strobe 17 or similar light source to highlight the area with a focused beam of light.

In one or more embodiments, for a physical tether 9, the instructions include the process for extending the tether 9 from the security device 11 and attaching it to the package 80. After the physical tether 9 is attached or the virtual tether 9 is armed, the instructions may include a notice on the user interface 19 or an alert (e.g., via an app on a smart device (e.g., smartphone, computing pad, etc.), email, text message, cellular message, a remote wireless device (e.g., a fob, remote control, etc.)) that confirms the tether 9 is armed and the package 80 is secured. The security device 11 may then receive additional instructions from the customer interface 20 regarding the delivery of a second package 81 at Time B, which is different from Time A. When package 81 is delivered, the user interface 19 on the security device 11 may provide instructions to the delivery person or device for scanning the package delivery label with the scanner 15. Once the scanned information is confirmed, the user interface 19 then provides instructions to the delivery person or device as to where the package 81 should be placed such that the tether 9 will be armed for both previously delivered package 80 and the new package 81.

In some embodiments, for a virtual tether 9, the instructions include an image of the area in front of the security device 11 indicating a highlighted location for placing the package 80. For the virtual tether 9, these instructions may also include projecting a zone onto the area in front of the security device 11 by using the strobe 17 or similar light source to highlight the area with a focused beam of light. The highlighted area may be adjacent the package 80, it may be on the top of the package 80 or one or more sides of the package 80. For a physical tether 9, the instructions may include the process for extending a second tether 9 from the security device 11 and attaching it to the package 80. After the one or more physical tethers 9 are attached or the one or more virtual tethers 9 are armed, the instructions may include a notice on the user interface or an alert (e.g., via an app on a smart device (e.g., smartphone, computing pad, etc.), email, text message, cellular message, a wireless remote device (e.g., a fob, remote control, etc.)) that confirms the tether 9 is armed and both packages 80 and package 81 are secured. In addition, the tether 9 may be a mat or platform and the user interface 19 may provide instructions to the delivery person or device to place package 81 adjacent to package 80, which was already on the mat/platform or on top of package 80 (already on the mat/platform). In either case, the mat/platform tether may detect the additional weight or mass of package 81 and transmit that data or information to the one or more processor devices 13, which then transmit instructions to the user interface 19 to display a notice that the packages where "Armed" and "Secure," or provide an alert (e.g., via an app on a smart device (e.g., smartphone, computing pad, etc.), email, text message, cellular message, a wireless remote device (e.g., a fob, remote control, etc.)).

In one or more embodiments, the customer interface 20 or the user interface 19 may be used to define the location, size, and shape of the virtual tether 9 armed and secure zone. For example, the customer interface 20 or the user interface 19 may be used to define a very small area (e.g., 2 feet wide by 2 feet deep by 1 foot high virtual tether 9 zone that begins 2 feet in front of the security device 11) in order to arm and secure a package or object 80 that fits inside that zone that is planned for delivery. By defining a particular zone, the delivered package 80 can still be armed and secured, and any additional movement outside of that zone does not trigger an unauthorized movement event (e.g., an animal (e.g., a cat, a dog, etc.) walking by one foot outside the zone will not cause a trigger). The customer interface 20 or user interface 19 may be used to update or change the size of a defined virtual tether 9 zone in order to arm and secure a larger package 80 or for the planned delivery of additional packages on a particular day. In addition to defining a virtual tether 9 zone, the customer interface 20 or user interface 19 may also be used to define a larger movement detection zone outside of the virtual tether 9 zone. For example, a small 2 feet wide by 2 feet deep by 1 foot high virtual tether 9 zone that starts 2 feet in front of the security device 11 may be defined, and an additional 10 foot wide by 25 feet deep by 8 feet high movement detection zone may be defined that starts 4 feet in front of the security device 11. This movement detection zone may be used to detect movement outside of the virtual tether 9 zone, and that movement may cause a different set of actions by the security device 11. For example, the customer interface 20 or user interface 19 that was used to define the movement detection zone may also be used to set a low level visible (or strobe) alert 17 (FIGS. 1-2) and/or a low audible (or speaker) alert 18 and/or turn on the one or more cameras 16 to send video data to the customer interface 20. In this manner, the security device 11 provides both of the armed and secure functions for securing a package 80, as well as a notification and deterrence function related to an unauthorized person approaching the package 80.

In one or more embodiments, the security device 11 includes a bell or speaker 7. The bell or speaker 7 may be configured to activate the doorbell of the location where the security device 11 is located. The bell or speaker 7 may be connected to the doorbell either with a direct line wired or wirelessly. The use of a separate bell 7 to activate the doorbell of the location where the security device 11 is located provides one process for activating the doorbell. In one embodiment, the user interface 19 may be used to activate the doorbell. For example, the user interface 19 may include a touchscreen that is configured with a window or popup window with a virtual button or bell on it, that when pressed activates the location's doorbell. The user interface 19 may also include a microphone that detects the sound of arrival of a person or device and automatically activates the doorbell. Alternately the microphone may activate the doorbell after detecting the command "Ring the doorbell" that was spoken by the arriving person using NLU/NLP. In one embodiment, the one or more cameras 16 may be used to visually detect the arrival of a person or device to activate the doorbell.

In some embodiments, the security device 11 includes a global positioning sensor (GPS) receiver 29. The GPS receiver 29 is configured to receive data/information from at least one satellite network and to transfer that data/information to the one or more processor devices 13. The GPS data/information may be used to assist in locating the security device 11 by the third-party in order to efficiently deliver a package 80 to the correct location.

Figure 12:
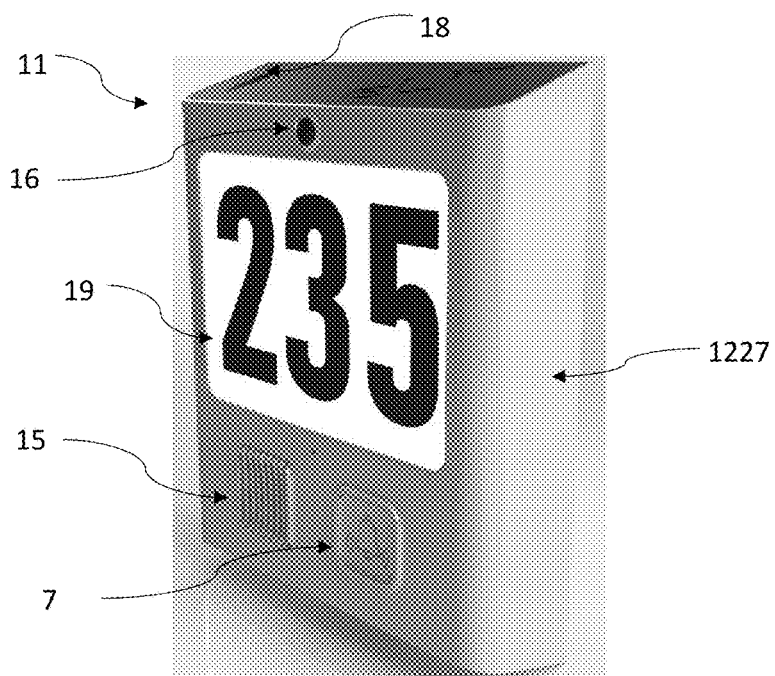
FIG. 12 shows a side perspective view of an example embodiment of the security device, according to one or more embodiments.
Figures 13, 14:
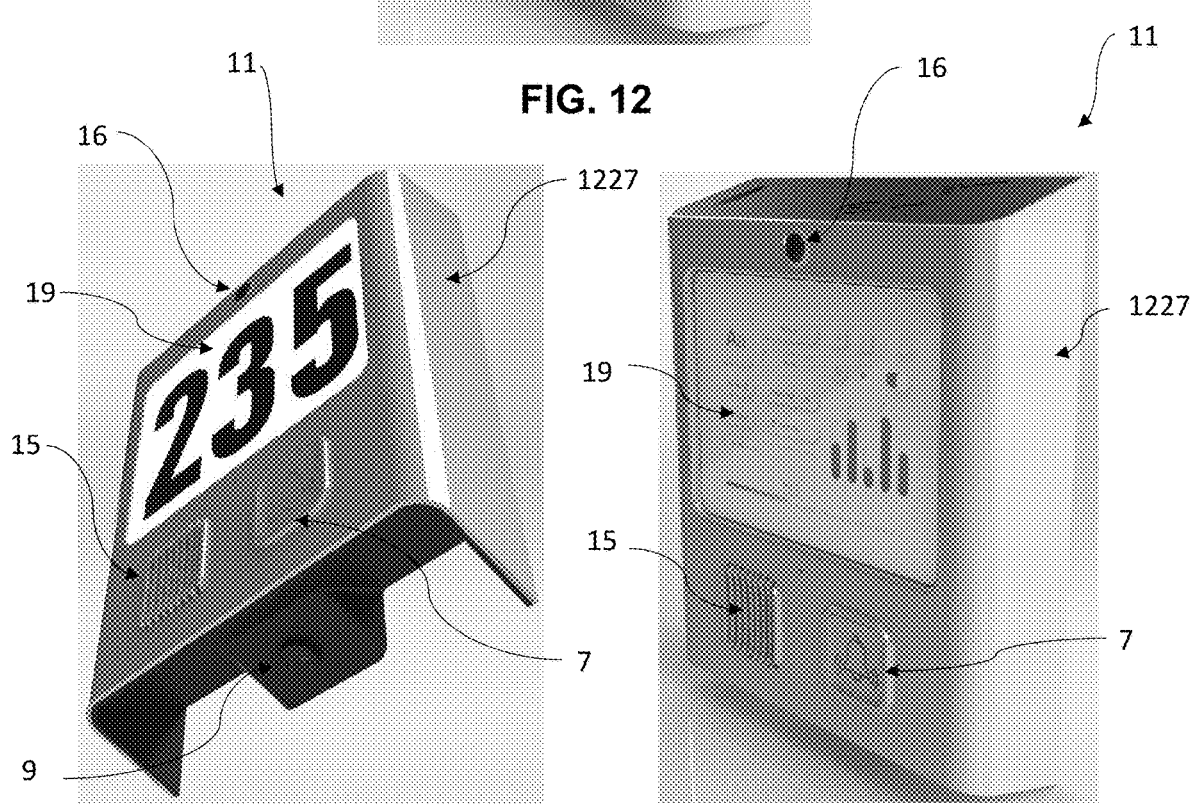
FIG. 13 shows a bottom perspective view of an example embodiment of the security device, according to one or more embodiments.
FIG. 14 shows a side perspective view of the security device showing an example user interface display, according to one or more embodiments.

FIG. 12 shows a side perspective view of an example embodiment of the security device 11, according to one or more embodiments. FIG. 13 shows a bottom perspective view of an example embodiment of the security device 11, according to one or more embodiments. FIG. 14 shows a side perspective view of the security device 11 showing an example user interface 19 display, according to one or more embodiments. In FIG. 12 an example security device 11 is shown including a housing 1227 with a user interface 19, a camera 16, a scanner 15 and a bell 7 on the front surface. The housing 1227 includes a speaker or audible alarm 18 on the top surface. The user interface 19 is configured to display the address number of the location. By displaying the address number, the user interface 19 assists the delivery person or device in locating the correct delivery address. In FIG. 13 the bottom of the housing 1227 is configured with a (physical) tether 9. With the security device 11 mounted on an exterior wall of a location, the tether 9 has a clear view of the ground surface in front of the security device 11 in order to secure packages placed on a surface in front of the security device 11.

In some embodiments, FIG. 13 shows a single tether 9. The security device 11 may also be configured with additional tethers 9 (e.g., 2, 3, 4, etc.), which may each be used to secure different packages. FIG. 14 shows the security device 11 with the user interface 19 showing a menu display of different options, adjustments, features, etc. The user interface 19 displays a wide variety of images and information, including but not limited to, the location address, the image captured by the camera 16, instructions for a delivery person to scan a package, instructions on how to arm the delivered package with either a physical or virtual tether 9, notification that a package is armed or secure, etc. The package or other physical object may be disarmed by the owner of the security device by either inputting disarm instructions via the customer interface 20 (FIGS. 9-14) or the user interface 19. The owner or authorized person may also send disarming instructions to the security device 11 to be displayed on the user interface 19 in order to enable a designated person that is authorized to disarm the package 80. In some embodiments, facial recognition may be employed in order to recognize authorized individuals or delivery persons, or to send an alert and image or video of any unrecognized individuals to the user.

Figure 15:
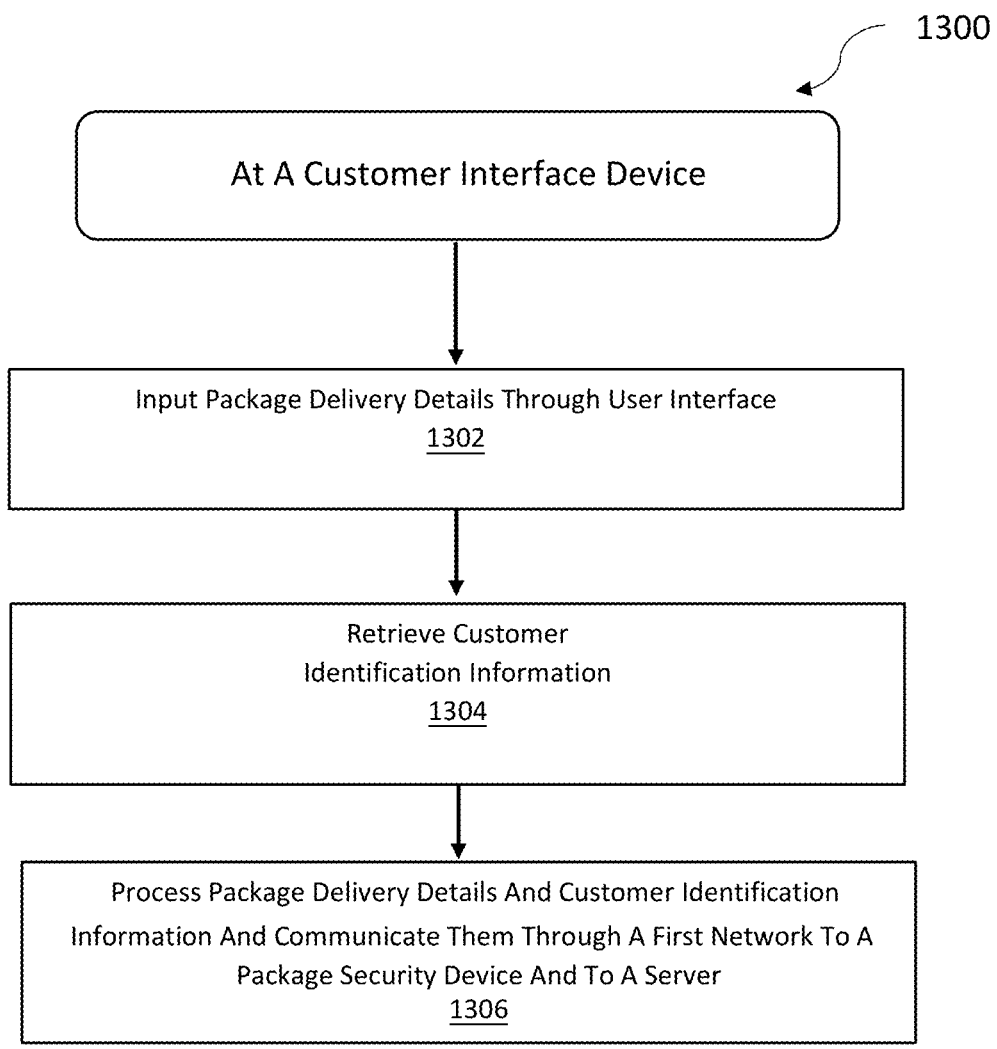
FIG. 15 shows an example process for processing and transmitting data from a customer interface to both a security device and a server, according to one or more embodiments.

FIG. 15 shows an example process 1300 for processing and transmitting data from a customer interface 20 (FIGS. 9-14) to both the security device 11 (FIGS. 9-14) and a server 30, according to one or more embodiments. The process 1300 may be performed at the customer interface 20 by processing logic that may include hardware (circuitry, dedicated logic, etc.), software, or a combination thereof. The process 1300 and/or each of their individual functions, subroutines, or operations may be performed by one or more processors of the customer interface 20 (e.g., one or more processor devices 23 of FIG. 9) implementing the process 1300. In some embodiments, the process 1300 may be performed by a single processing thread. In one or more embodiments, the process 1300 may be performed by two or more processing threads, each thread implementing one or more individual functions, routines, subroutines, or operations of the methods. In block 1302, the process 1300 provides that the customer interface 20 receives package delivery details (data/information) through a user interface 19 (FIGS. 9-11). The package delivery details may include delivery address information, special instructions, etc. The delivery address information may be input using the user interface 19 in the standard form for addresses in that location such as street number, street name, unit number, name of town, name of state or province, the address code such as a zip code, etc.

In some embodiments, the package delivery details may include the date and approximate time of the planned delivery. The package delivery details may further include delivery company information including the delivery company name and delivery company contact information. In one or more embodiments, the delivery driver or device details (e.g., type of vehicle or device, image of the driver, license plate information, etc.) may also be included in the package delivery details. The package delivery details may additionally include the number of packages being delivered, the relative size of the packages, the contents of the packages, the weight of the packages and any specific instructions to ensure secure delivery of the packages. In block 1304, the process 1300 provides that the customer interface 20 retrieves unique customer identification information that is stored on either internal or external memory (e.g., memory 27 of FIG. 9). The customer identification information may include customer first and last name, customer's mailing address, customer's email address, customer's phone number, customer password, unique identification number assigned to the customer at the time of purchase of the security device 11 or assigned after purchase of the security device 11 while registering the security device 11 with the manufacturer.

In some embodiments, in block 1306 the process 1300 provides that the delivery information and unique identification information are processed (e.g., using one or more processor devices 23, FIGS. 9-11) and transmitted through a network (e.g., the first network 40, FIGS. 9-11) by the comms 21 (FIGS. 9-11) to the server 30 (FIGS. 9-11) and the security device 11.

In one or more embodiment, for ease of explanation, the process 1300 is depicted and described as a series of operations. However, operations in accordance with this disclosure may occur in various orders and/or concurrently, and/or with other operations not presented and described herein. For example, the operations depicted in the process 1300 may occur in combination with any other operation of any other method disclosed herein. Furthermore, not all illustrated operations may be required to implement the process 1300 in accordance with the disclosed subject matter. In addition, those skilled in the art will understand and appreciate that the process 1300 could alternatively be represented as a series of interrelated states via a state diagram, a directed graph, a deterministic finite state automaton, a non-deterministic finite state automaton, a Markov diagram, or event diagrams.

Figure 16:
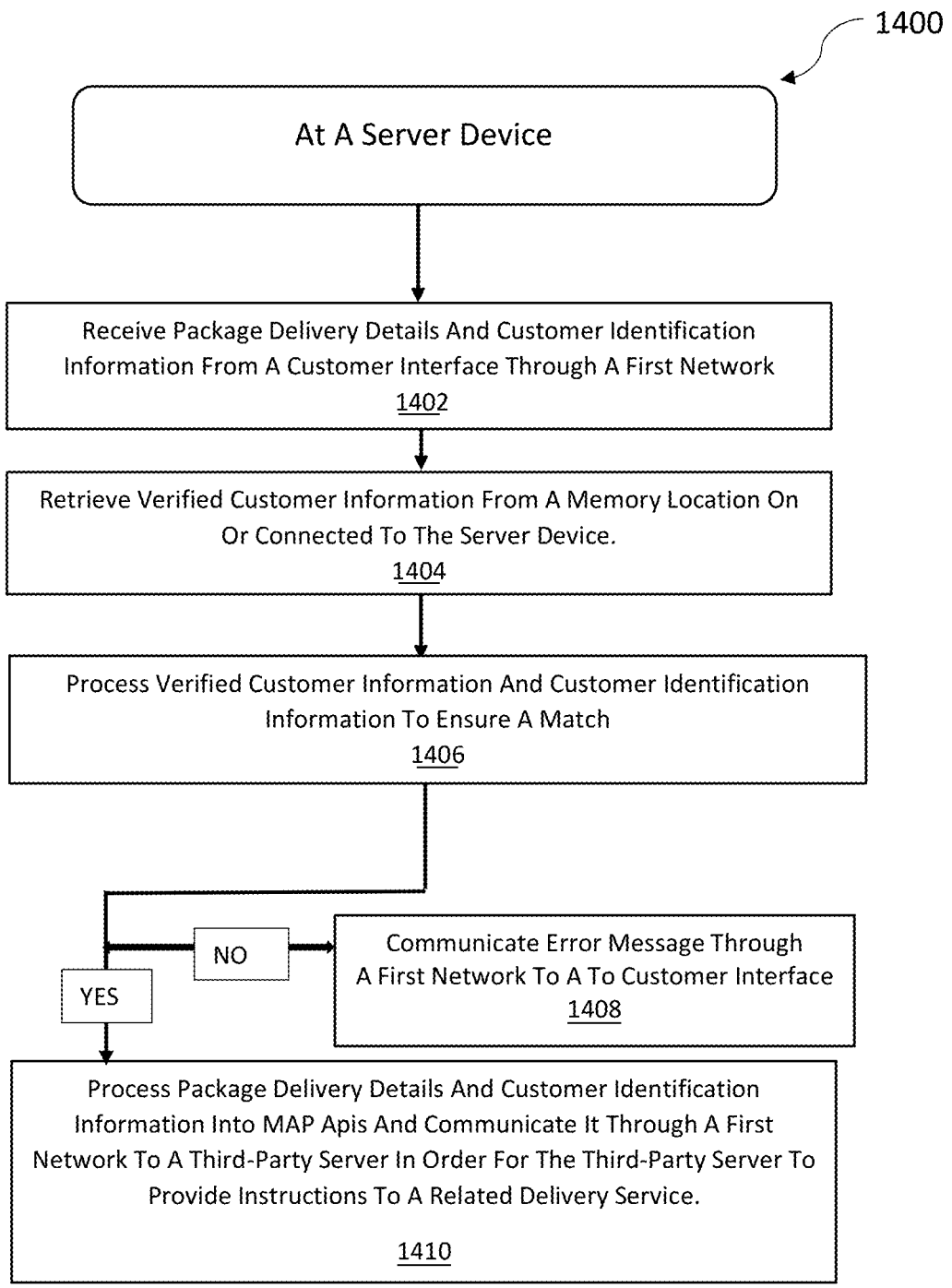
FIG. 16 shows an example embodiment of a process for processing and transmitting data from a server to both a third-party server and a customer interface, according to one or more embodiments.

FIG. 16 shows an example embodiment of a process 1400 for processing and transmitting data from a server 30 (FIGS. 9-11) to both a third-party server 50 (FIGS. 9-11) and a customer interface 20 (FIGS. 9-11), according to one or more embodiments. The process 1400 may be performed by processing logic that may include hardware (circuitry, dedicated logic, etc.), software, or a combination thereof. The process 1400 and/or each of its individual functions, subroutines, or operations may be performed by one or more processor devices 33 (FIGS. 9-11) of the server 30 (FIGS. 9-11) implementing the process 1400. In some embodiments, the process 1400 may be performed by a single processing thread. In one or more embodiments, the process 1400 may be performed by two or more processing threads, each thread implementing one or more individual functions, routines, subroutines, or operations of the process 1400. In block 1402, the process 1400 provides that a comms 31 (FIGS. 9-11) of the server 30 receives package delivery and customer identification information from the customer interface 20 (FIGS. 9-11) through the first network 40 (FIGS. 9-11).

In some embodiments, in block 1404 the process 1400 provides that the verified customer information that is stored on either internal or external memory (e.g., the memory 35, FIGS. 9-11) is retrieved. The retrieved verified customer information and the received customer identification information are then processed using the one or more processor devices 23 (FIGS. 9-11) to ensure a match. In block 1406 the process 1400 provides that if the two sets of information do not properly match, an error message or alert is generated by the one or more processor devices 23 sent to the comms 31 (FIGS. 9-11) and transmitted through the network 40 to the customer interface 20 in block 1408. In block 1410 the process 1400 provides that if the two sets of information properly match, the package delivery information and customer identification information are processed by the one or more processor devices 23 into map application programming interfaces (APIs), sent to the comms 31 and transmitted through the network 40 to the third-party server 50.

In one or more embodiments, the map APIs may be utilized by the third-party server 50 to facilitate information to a delivery person for the safe and timely delivery of a package to the location of the security device 11. The operations depicted in the process 1400 may occur in combination with any other operation of any other process disclosed herein. Furthermore, not all illustrated operations may be required to implement the process 1400 in accordance with the disclosed subject matter. In addition, those skilled in the art will understand and appreciate that the process 1400 could alternatively be represented as a series of interrelated states via a state diagram, a directed graph, a deterministic finite state automaton, a non-deterministic finite state automaton, a Markov diagram, or event diagrams.

Figure 17:
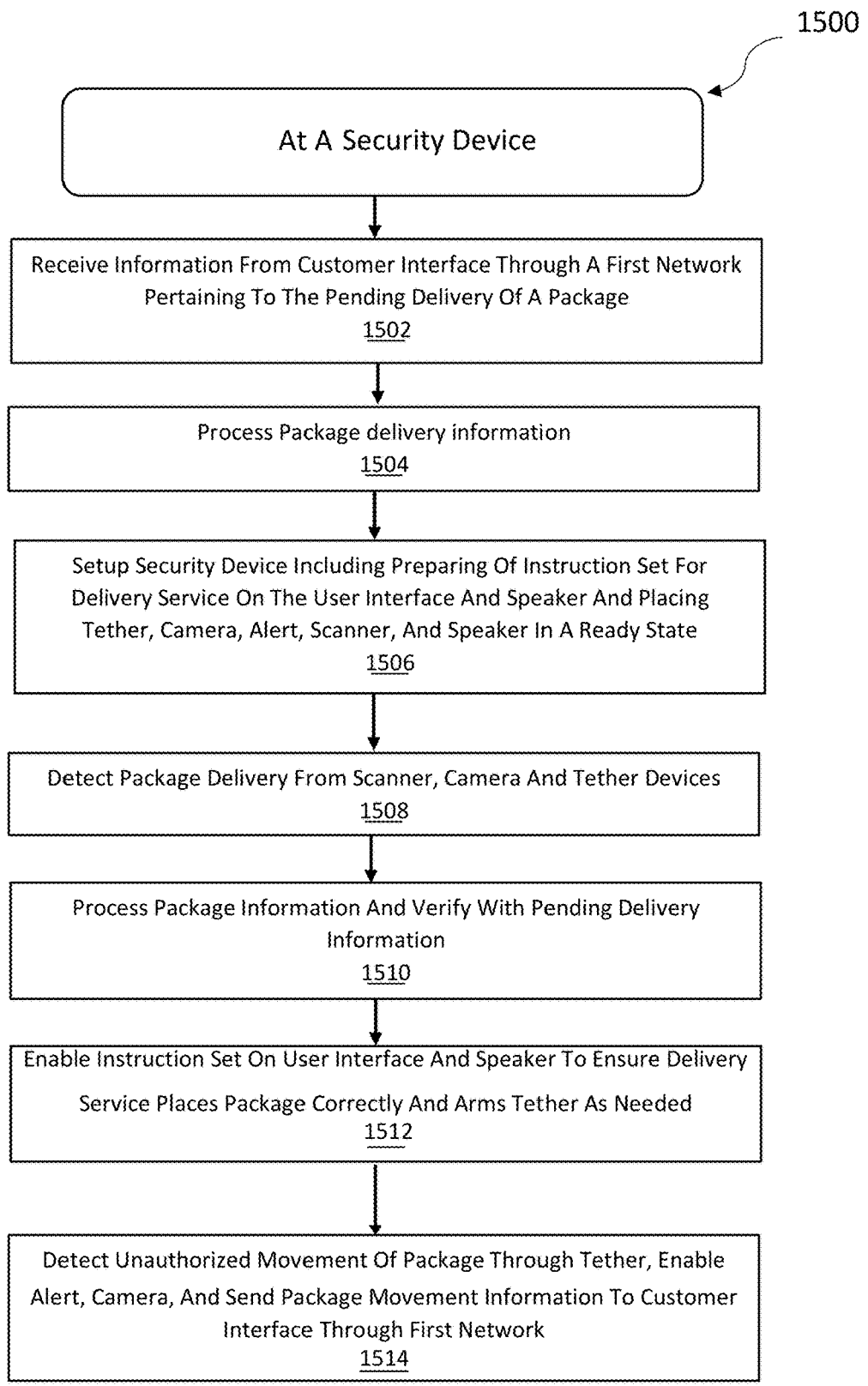
FIG. 17 shows an example embodiment of a process for processing and transmitting data from a security device to both a delivery person and a customer interface, according to one or more embodiments.

FIG. 17 shows an example embodiment of a process 1500 for processing and transmitting data from the security device 11 (FIGS. 9-11) to both a delivery person and the customer interface 20 (FIGS. 9-11), according to one or more embodiments. In some embodiments, in block 1502 of process 1500 provides that the comms 12 (FIGS. 9-11) of the security device 11 receives package delivery information from the customer interface 20 through a network (e.g., the first network 40, FIGS. 9-11). In block 1504 process 1500 provides that a processor (e.g., one or more processor devices 13, FIGS. 9-11) processes the delivery information to properly setup the security device 11. In block 1506 process 1500 provides that the processor sets up the security device 11 by preparing package delivery instructions to be displayed on a user interface (e.g., user interface 19, FIGS. 9-11) and/or delivered by an audio speaker (e.g., speaker 18, FIGS. 9-11) and also by placing a tether (e.g., tether 9 (physical, virtual or both, FIGS. 9-11), a camera (e.g., one or more cameras 16 of FIGS. 9-11), a scanner (e.g., scanner 15, FIGS. 9-11), and an alert (e.g., strobe 17, FIGS. 9-10) in a ready state.

In some embodiments, in block 1508 the process 1500 provides that a package delivery is detected by one or more of the scanner, the camera, or a tether. In block 1510 the process 1500 provides that the processor processes the delivered package information and verifies it against the previously received pending delivery information, which may be retrieved from a memory location (e.g., the memory 14, FIGS. 9-11). If the information is verified, then in block 1512 of the process 1500, the processor enables the delivery instructions on the user interface and/or delivered by the audio speaker to ensure the package is placed correctly. After the package is place correctly, the tether is armed to detect further unauthorized movement of the package. In block 1514 the process 1500 provides that a tether detects unauthorized movement of the package and sends that information to the processor, which enables an alert (e.g., speaker-alert 18, strobe 17, FIGS. 9-10, the camera, via an app on a smart device (e.g., smartphone, computing pad, etc.), email, text message, cellular message, a wireless remote device (e.g., a fob, remote control, etc.)).

In one or more embodiments, the processor also sends information of the unauthorized movement including data from a camera and/or microphone to a communication module (e.g., communication module 12 of FIG. 9) which transmits the information through the network to the customer interface. In this manner, process 1500 provides immediate information to the owner of the security device 11 of the unauthorized movement of a delivered package. The security device 11 may also be configured to send information of the unauthorized movement of the package including a video feed directly to the local authorities to enable the timely identification and apprehension of the person (or device) moving or taking the package.

In some embodiments, in process 1500 the customer interface or user interface may also be used to define what unauthorized movement of the package entails. In one example embodiment, the package may be a paper bag of groceries or a small and light weight bubble wrap envelope. In this example, a breeze may cause one or more small movements of the package that would not be classified as unauthorized, and the owner of the security device 11 would not want a notification or alarm to be triggered. In one or more embodiments, the customer interface or user interface may be used to define unauthorized movement as the package 80 moving a particular distance, such as more than 2 inches in any direction, more than 4 inches in any direction, etc.

In one or more embodiments, the customer interface or user interface may also be used to define how long after scanning a package label or receiving an RFID of a package before the virtual tether is armed. In some embodiments, the customer interface or user interface may be used to define how long after placing the package in the virtual tether zone before the virtual tether is armed. In one example embodiment, if multiple packages are being delivered, the time between scanning the first package and arming the virtual tether may be set for 2 minutes, for 3 minutes, etc., to allow all the packages to be scanned and placed before arming the virtual tether.

In some embodiments, through a combination of the processes 1300, 1400 and 1500 (FIGS. 15-17) as described herein, the security device 11, customer interface 20, and server 30 of the system 10 provide secure authorized and location precise contact-less (for virtual tether 9) or minimal contact (for physical tether 9) delivery by third parties of one or more delivery packages. The system 10 may be used in this manner to deter package theft. The system 10 may also be used in this manner to assist in the identification and apprehension related to package theft. The system 10 may also be used in this manner to assist in the accurate delivery of packages to the intended location. The processes 1300, 1400 and 1500 also provide enhanced notification to a customer of the delivery of a package as well as the unauthorized movement of a package that has been delivered. The processes 1300, 1400 and 1500 may also provide enhanced notification to a third-party of the delivery of a package as well as the unauthorized movement of a package that has been delivered. For example, a third-party delivery service can opt-in to the system 10 data network subscription so that the third-party can receive notification from the system 10 through a first network 40 of the successful delivery and/or successful delivery and arming of one or more packages. The third-party may also be notified by the security device 11 of unauthorized movement of the delivered and armed package(s) through the first network 40 to a third-party server 50.

In one or more embodiments, the process of securing packages and deterring package theft can be helpful in many different situations. For example, when accurately delivering a package to a particular apartment in a large apartment complex, the apartment location in many mapping locations is shown as just the front door of the apartment building. The actual location of the individual apartment is often not designated with more precision than the front entrance. This can be of even more importance when there are numerous buildings in an apartment complex. Using the system 10 (FIGS. 9-11) allows the delivery person to ensure proper delivery location. Similarly, a mall often shows every business address located in the mall at a single location when each individual business has its own unique location in the mall. Using the system 10 embodiments may assist both residential customers and business customers to provide more accurate and secure locations so that friends, delivery services, emergency management services, and customers can all find the residential and or business location for faster deliveries.

In some embodiments, the system 10 (FIGS. 9-11) may also be useful for locations that do not have a designated address, such as a location that is still under development or a location that is under redevelopment. During large construction projects such as residential or commercial development or redevelopment it is still important for suppliers to quickly find the current location in the development site and deliver the requested supplies safely. The system 10 described herein may be very helpful in directing suppliers, workers, inspectors, visitors, etc. to the desired location or locations in the development site. Similarly many rural locations and many locations in under-developed countries do not have detailed and specified addresses or secure delivery features. The system 10 embodiments can be helpful in directing friends, delivery services, emergency responders, customers and the like to rural locations and locations in countries and jurisdictions that do not have a detailed and specific address system or secure delivery locations.

Figure 18:
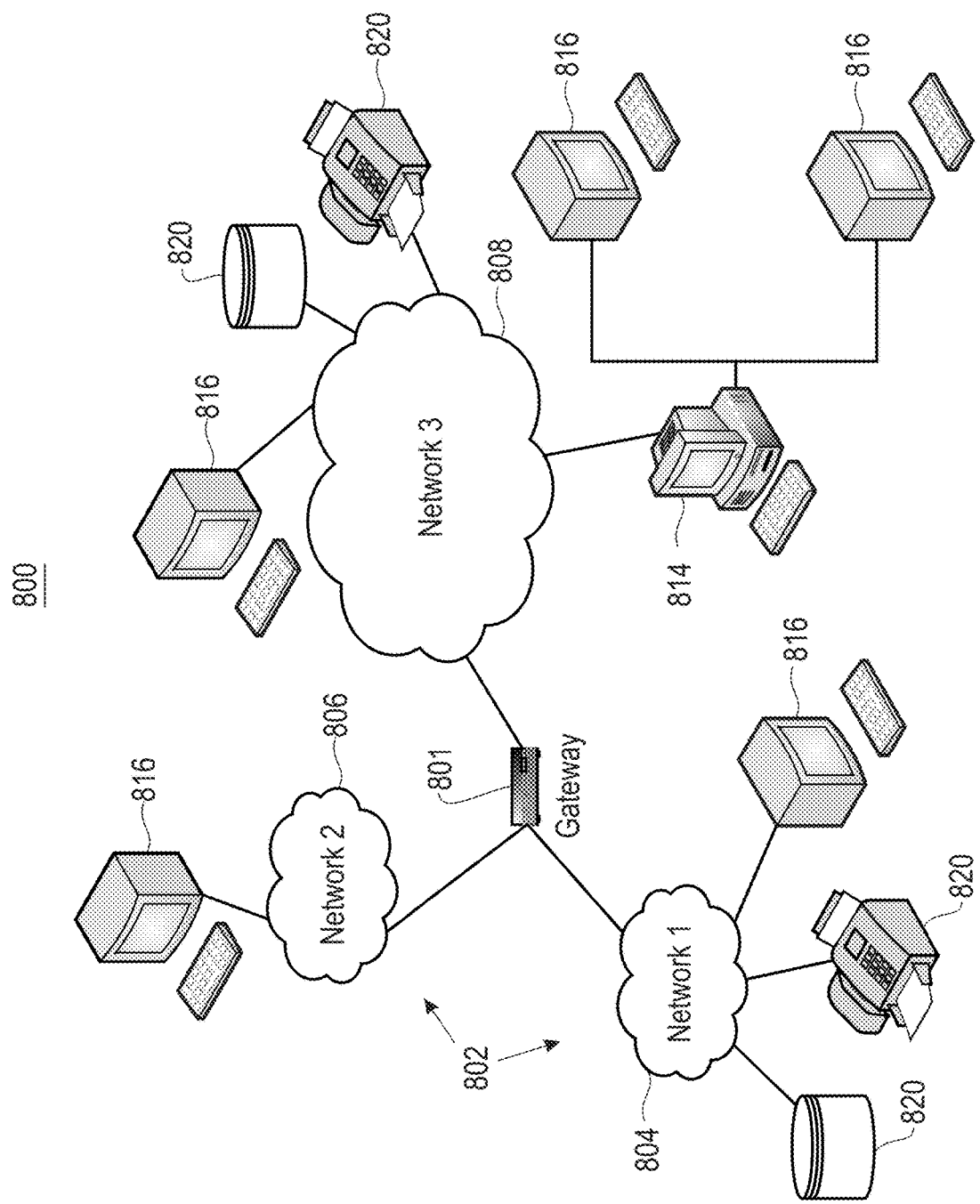
FIG. 18 is a network architecture of a system for security processing, according to one or more embodiments.

FIG. 18 is a network architecture of a system 800 for security processing, according to one or more embodiments. As shown in FIG. 18, a plurality of remote networks 802 are provided, including a first remote network 804 and a second remote network 806. A gateway 801 may be coupled between the remote networks 802 and a proximate network 808. In the context of the present network architecture 800, the networks 804, 806 may each take any form including, but not limited to, a LAN, a WAN, such as the Internet, public switched telephone network (PSTN), internal telephone network, etc.

In use, the gateway 801 serves as an entrance point from the remote networks 802 to the proximate network 808. As such, the gateway 801 may function as a router, which is capable of directing a given packet of data that arrives at the gateway 801, and a switch, which furnishes the actual path in and out of the gateway 801 for a given packet.

Further included is at least one data server 814 coupled to the proximate network 808, which is accessible from the remote networks 802 via the gateway 801. It should be noted that the data server(s) 814 may include any type of computing device/groupware. Coupled to each data server 814 is a plurality of user devices 816. Such user devices 816 may include a desktop computer, laptop computer, handheld computer, printer, and/or any other type of logic-containing device. It should be noted that a user device 816 may also be directly coupled to any of the networks in some embodiments.

A peripheral 820 or series of peripherals 820, e.g., facsimile machines, printers, scanners, hard disk drives, networked and/or local storage units or systems, etc., may be coupled to one or more of the networks 804, 806, 808. It should be noted that databases and/or additional components may be utilized with, or integrated into, any type of network element coupled to the networks 804, 806, 808. In the context of the present description, a network element may refer to any component of a network.

According to some approaches, methods and systems described herein may be implemented with and/or on virtual systems and/or systems, which emulate one or more other systems, such as a UNIX® system that emulates an IBM® z/OS environment, a UNIX® system that virtually hosts a MICROSOFT® WINDOWS® environment, a MICROSOFT® WINDOWS® system that emulates an IBM® z/OS environment, etc. This virtualization and/or emulation may be implemented through the use of VMWARE® software in some embodiments.

Figure 19:
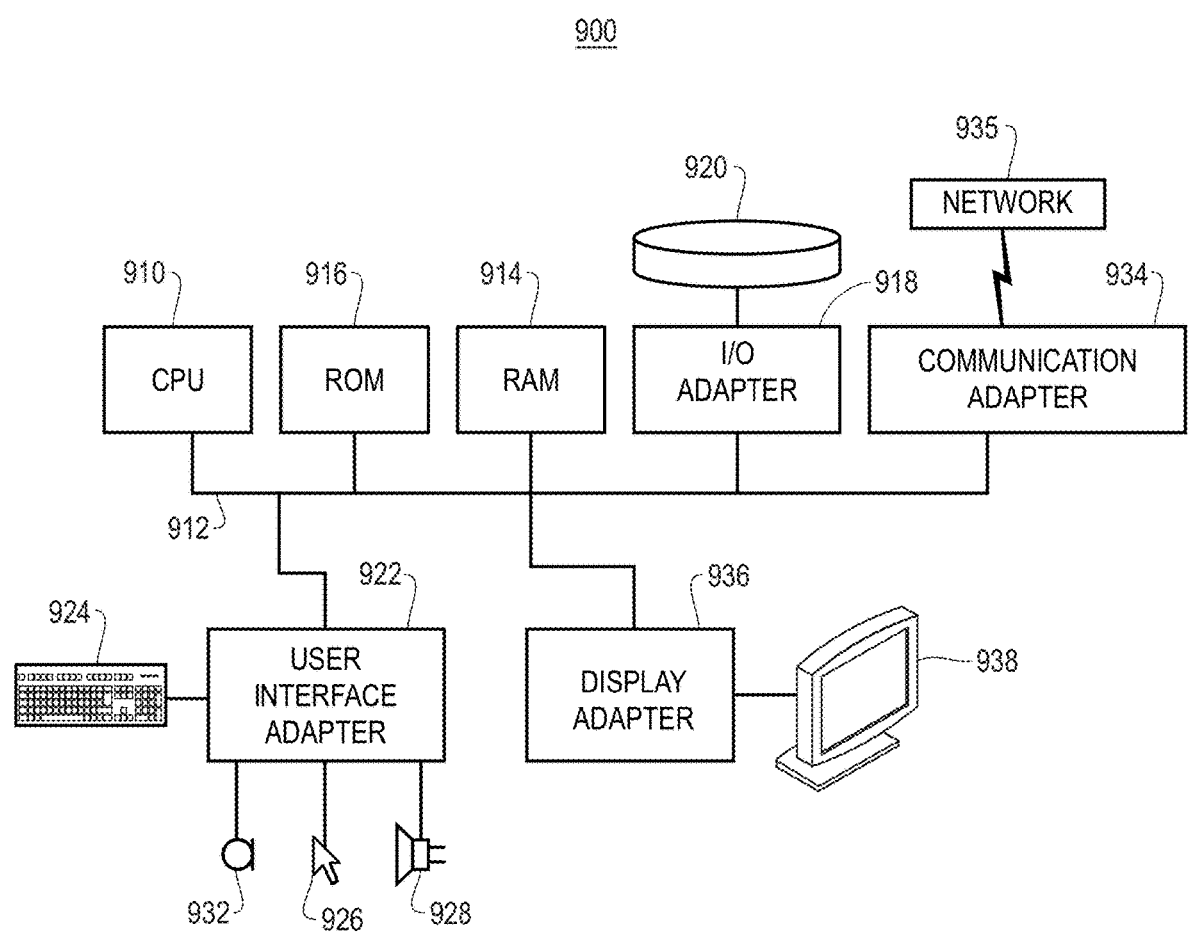
FIG. 19 shows a representative hardware system environment associated with a user device and/or server, according to one or more embodiments.

FIG. 19 shows a representative hardware system 900 environment associated with a user device 816 and/or server 814 of FIG. 18, in accordance with one embodiment. In one example, a hardware configuration includes a workstation having a central processing unit 910, such as a microprocessor, and a number of other units interconnected via a system bus 912. The workstation of FIG. 19 may include a Random Access Memory (RAM) 914, Read Only Memory (ROM) 916, an I/O adapter 918 for connecting peripheral devices, such as disk storage units 920 to the bus 912, a user interface adapter 922 for connecting a keyboard 924, a mouse 926, a speaker 928, a microphone 932, and/or other user interface devices, such as a touch screen, a digital camera (not shown), etc., to the bus 912, communication adapter 934 for connecting the workstation to a communication network 935 (e.g., a data processing network) and a display adapter 936 for connecting the bus 912 to a display device 938.

In one example, the workstation may have resident thereon an operating system, such as the MICROSOFT® WINDOWS® Operating System (OS), a MAC OS®, a UNIX® OS, etc. In one embodiment, the system 900 employs a POSIX® based file system. It will be appreciated that other examples may also be implemented on platforms and operating systems other than those mentioned. Such other examples may include operating systems written using JAVA®, XML, C, and/or C++ language, or other programming languages, along with an object oriented programming methodology. Object oriented programming (OOP), which has become increasingly used to develop complex applications, may also be used.

Figure 20:
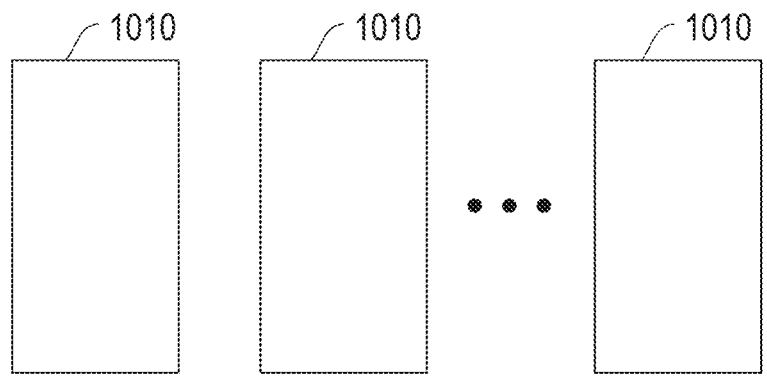
FIG. 20 is a block diagram illustrating a distributed system that may be employed for security processing, according to one or more embodiments.
Figure 20:
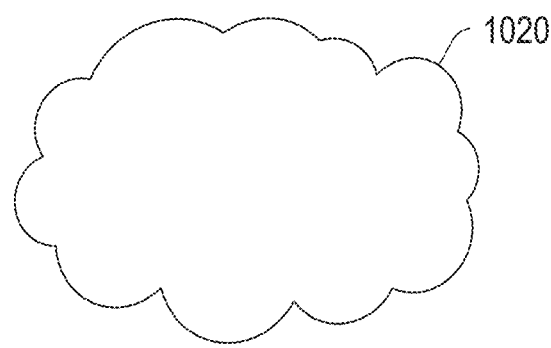
Figure 20:
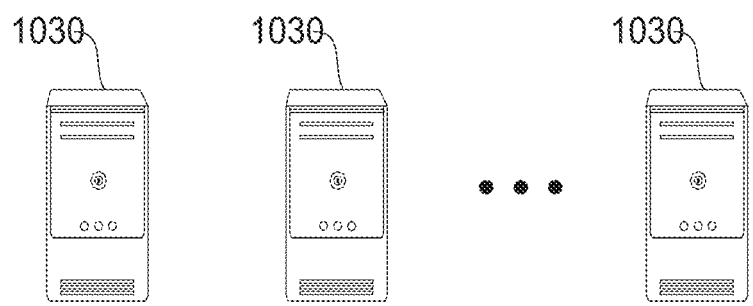

FIG. 20 is a block diagram illustrating a distributed system 1000 that may be employed for security processing, according to one or more embodiments. In one embodiment, the system 1000 includes client devices 1010 (e.g., mobile devices, smart devices, computing systems, etc.), a cloud or resource sharing environment 1020 (e.g., a public cloud computing environment, a private cloud computing environment, a data center, etc.), and servers 1030. In one embodiment, the client devices are provided with cloud services from the servers 1030 through the cloud or resource sharing environment 1020.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

The corresponding structures, materials, acts, and equivalents of all means or step plus function elements in the claims below are intended to include any structure, material, or act for performing the function in combination with other claimed elements as specifically claimed. The description of the embodiments has been presented for purposes of illustration and description, but is not intended to be exhaustive or limited to the embodiments in the form disclosed. Many modifications and variations will be apparent to those of ordinary skill in the art without departing from the scope and spirit of the invention.

Although the embodiments herein are described with various specific embodiments, it will be obvious for a person skilled in the art to practice the invention with modifications. However, all such modifications are deemed to be within the scope of the claims.

References in the claims to an element in the singular is not intended to mean "one and only" unless explicitly so stated, but rather "one or more." All structural and functional equivalents to the elements of the above-described exemplary embodiment that are currently known or later come to be known to those of ordinary skill in the art are intended to be encompassed by the present claims. No claim element herein is to be construed under the provisions of 35 U.S.C. section 112, sixth paragraph, unless the element is expressly recited using the phrase "means for" or "step for."

While the foregoing written description of the embodiments enables one of ordinary skill to make and use what is considered presently to be the best mode thereof, those of ordinary skill will understand and appreciate the existence of variations, combinations, and equivalents of the specific embodiments, method, and examples herein. The embodiments should therefore not be limited by the above-described embodiments, method, and examples, but by all embodiments and methods within the scope and spirit as claimed.

It is also to be understood that the following claims are intended to cover all of the generic and specific features of the embodiments described herein and all the statements of the scope of the embodiments which as a matter of language might be the to fall there between.

What is claimed is:

1. A secure package delivery and pick-up system, the system comprising:
a security door comprising a frame;
one or more collapsible storage compartments affixed to the frame, wherein each of the one or more collapsible storage compartments is configured for accommodating one or more packages, and open ends of the one or more collapsible storage compartments are secured using compartment doors;
an electronic unit mounted on the frame, wherein the electronic unit is configured for electronically controlling an operation for the one or more collapsible storage compartments; and
a security device coupled to the security door, the security device including a memory device including instructions, and at least one processor executing the instructions to:
receive images of at least one physical object from a first camera coupled to the at least one processor;
receive an indication from at least one security tether indicating movement of the at least one physical object, wherein the at least one security tether comprises a physical security tether device coupled to the at least one processor, the physical security tether device configured to removably couple to at least one physical object; and
provide an alert based on the indication of movement of the at least one physical object.

2. The system of claim 1, wherein the electronic unit comprises one or more of a control unit, a transceiver unit, a digital display, a second camera, a scanner unit, a sensor, and a power unit, wherein each the one or more collapsible storage compartments has a front open end and a rear open end, both the front open end and the rear open end are secured by the compartment doors.

3. The system of claim 2, wherein the transceiver unit is configured for transmitting an electronic key to verify with a server for operating the security door or individual compartments of the one or more collapsible compartments, and the transceiver unit is further configured for transmitting information captured.

4. The system of claim 2, wherein:
the instructions are further configured to: receive information for the at least one physical object using a scanner device coupled to the at least one processor;
the alert comprises one of an email alert, a text message alert, a doorbell alert, or a combination thereof, and
the control unit is configured for controlling opening and closing operations of an appropriate storage compartment door after a successful verification of a secure electronic key.

5. The system of claim 4, wherein the scanner device is one of: configured for reading a printed code, a radio frequency identification (RFID) receiver, or a combination thereof.

6. The system according to claim 2, further comprising:
a mobile application installed on a smartphone;
wherein:
the mobile application is configured for enabling a user to perform one or more of:
remotely tracking a package delivery or pick-up activity,
viewing captured information from one or more Internet of Things (IoT) devices,
an administration activity for adding a particular user, exchanging secure electronic keys with the control unit, and
lock or unlock the security door or individual compartments of the one or more collapsible storage compartments wirelessly from a remote location.

7. The system of claim 1, wherein the at least one security tether further comprises a virtual tether, the virtual tether is generated as a virtual security tether process using imaging of the first camera or data from at least one motion sensor, the virtual security tether process detects movement of the at least one physical object, and the alert comprises one of an audio alert, a visual alert, or a combination thereof.

8. The system of claim 7, wherein the at least one physical object comprises at least one of a delivery package, a personal item, an entry door, an entry gate, or a combination thereof, and information received for the at least one physical object is used for indications of a delivery.

9. The system of claim 7, wherein the first camera is configured for providing a visual security zone of the at least one physical object for the virtual security tether process, and the first camera is configured for recording upon detection of motion or movement of the at least one physical object.

10. The system of claim 1, further comprising a communication component coupled to the at least one processor, wherein the communication component receives information of a pending delivery from a customer interface or a server, and the information of the pending delivery provides visible and audible guidance to a delivery person or device for a timely and accurate delivery of the at least one physical object.

11. The system according to claim 1, further comprises:
one or more sensors that are configured for sensing a plurality of parameters surrounding the security door, and the plurality of parameters comprises motion detection in vicinity of the security door, international mobile equipment identity (IMEI) number of a smartphone present in a close vicinity of the security door, smoke, and fire.

12. The system according to claim 1, wherein the system further comprises an expandable platform for connecting one or more external Internet of Things (IOT) devices, and the one or more external IOT devices comprises one or more cameras, one or more sensors, one or more communication modules or a combination thereof.

13. A security device system comprising:
a security door comprising a frame;
one or more collapsible storage compartments affixed to the frame, wherein each of the one or more collapsible storage compartments is configured for accommodating at least one physical object;
an electronic unit mounted on the frame, wherein the electronic unit is configured for electronically controlling an operation of the one or more collapsible storage compartments;
a security device comprising:
a first memory device including first instructions;
a first processor for executing the first instructions to:
receive images of the at least one physical object from a first camera coupled to the first processor;
receive an indication from at least one security tether indicating movement of the at least one physical object; and
provide an alert based on the indication of movement of the at least one physical object;
a customer interface including:

a second memory device including second instructions;
a second processor for executing the second instructions to:
receive delivery details information;
retrieve customer identification information;
process the delivery details and customer identification information; and
communicate the delivery details and the customer identification information through a first network to the security device and to a server.

14. The security device system of claim 13, wherein the at least one security tether comprises a physical security tether device coupled to the first processor, the physical security tether device comprises an attachment element that is configured to removably couple with the at least one physical object, and the electronic unit comprises one or more of a control unit, a transceiver unit, a digital display, a second camera, a scanner unit, a sensor, and a power unit.

15. The security device system of claim 14, wherein the transceiver unit is configured for transmitting an electronic key to verify with the server for operating the security door or individual compartments of the one or more collapsible compartments, and the transceiver unit is further configured for transmitting information captured.

16. The security device system according to claim 14, further comprising:
a mobile application installed on a smartphone;
wherein: the mobile application is configured for enabling a user to perform one or more of:
remotely tracking package delivery or pick-up activity, viewing captured information from one or more Internet of Things (IoT) devices, an administration activity for adding and a particular user, exchanging secure electronic keys with the control unit, and lock or unlock the security door or individual compartments of the one or more collapsible storage compartments wirelessly from a remote location.

17. The security device system of claim 13, wherein the at least one security tether is generated as a virtual security tether process using imaging of the first camera or data from at least one motion sensor, and the virtual security tether process is configured to detect movement of the at least one physical object.

18. The security device system of claim 17, wherein the first camera is configured for providing a visual security zone of the at least one physical object for virtual security tether process.

19. The security device system of claim 18, wherein the first camera is configured for recording, upon detection of motion or movement of the at least one physical object.

20. The security device system of claim 13, wherein the alert comprises one of an audio alert, a visual alert, or a combination thereof, and the at least one physical object comprises at least one of a delivery package, a personal item, an entry door, an entry gate, or a combination thereof.

21. The security device system of claim 13, wherein the alert comprises one of an email alert, a text message alert, a doorbell alert, or a combination thereof.

22. The security device system of claim 13, wherein the security device further comprises a communication component coupled to the first processor, and the communication component receives information of a pending delivery from the customer interface or the server.

23. The security device system of claim 22, wherein the information of the pending delivery provides visible and audible guidance to a delivery person or device for a timely and accurate delivery of the at least one physical object.

24. The security device system of claim 13, wherein:
the first processor is further configured for executing the first instructions to:
receive information for the at least one physical object using a scanner device coupled to the first processor; and
the scanner device is one of: configured for reading a printed code, a radio frequency identification (RFID) receiver, or a combination thereof.

25. The security device system of claim 13, further comprises:
one or more sensors that are configured for sensing a plurality of parameters surrounding the security door, and the plurality of parameters comprises motion detection in vicinity of the security door, international mobile equipment identity (IMEI) number of a smartphone present in a close vicinity of the security door, smoke, and fire.

26. The security device system according to claim 13, further comprising an expandable platform for connecting one or more external Internet of Things (IOT) devices, and the one or more external IOT devices comprises one or more cameras, one or more sensors, one or more communication modules or a combination thereof.

* * * * *